United States Patent
Lee et al.

(10) Patent No.: US 8,862,564 B2
(45) Date of Patent: Oct. 14, 2014

(54) SPONSORING RESOURCE DOWNLOADS

(71) Applicant: Google Inc., Mountain View, CA (US)

(72) Inventors: Paul Lee, Palo Alto, CA (US); Gregory M. Hecht, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/671,103

(22) Filed: Nov. 7, 2012

(65) Prior Publication Data

US 2013/0246311 A1 Sep. 19, 2013

Related U.S. Application Data

(63) Continuation-in-part of application No. 13/422,164, filed on Mar. 16, 2012.

(51) Int. Cl.
*G06F 17/30* (2006.01)

(52) U.S. Cl.
USPC .......................................... 707/705; 707/706

(58) Field of Classification Search
CPC ............................... G06Q 20/24; G06Q 30/02
USPC .................................................. 707/705, 706
See application file for complete search history.

(56) References Cited

U.S. PATENT DOCUMENTS

| | | | |
|---|---|---|---|
| 5,913,026 A | 6/1999 | Bleidt et al. | |
| 6,061,733 A | 5/2000 | Bodin et al. | |
| 7,328,049 B2 | 2/2008 | Chanut | |
| 7,577,667 B2 * | 8/2009 | Hinshaw et al. | 1/1 |
| 7,853,478 B2 * | 12/2010 | Donahue et al. | 705/14.43 |
| 8,145,989 B2 | 3/2012 | Kim et al. | |
| 2002/0143621 A1 | 10/2002 | Donnelly et al. | |
| 2004/0002367 A1 | 1/2004 | Chanut | |
| 2004/0215775 A1 | 10/2004 | Murray, Jr. et al. | |
| 2005/0125354 A1 | 6/2005 | Pisaris-Henderson et al. | |
| 2006/0200455 A1 | 9/2006 | Wilson | |
| 2007/0162335 A1 | 7/2007 | Mekikian | |
| 2007/0208829 A1 | 9/2007 | Kim et al. | |

(Continued)

FOREIGN PATENT DOCUMENTS

| | | |
|---|---|---|
| EP | 1548606 | 6/2005 |
| EP | 1968000 | 9/2008 |

(Continued)

OTHER PUBLICATIONS

International Search Report and Written Opinion for Application No. PCT/US2013/031426, dated Jun. 24, 2013, 24 pages.

*Primary Examiner* — Baoquoc N To
(74) *Attorney, Agent, or Firm* — Fish & Richardson P.C.

(57) ABSTRACT

Methods, systems, and apparatus, including computer programs encoded on a computer-readable storage medium, and including a method for providing content. The method comprises receiving a request from a mobile device to load a resource and determining a transmission cost for loading the resource over a metered network. The method further comprises identifying sponsored content items for delivery with the resource, the sponsored content items being included in slots for presentation along with third-party content associated with the resource, each sponsored content item having an associated bid that represents an amount that will be paid by the sponsor for presentation of a given sponsored content item. The method further comprises determining a credit to be awarded toward load costs based on the bid, and providing a label that indicates a reduced cost to load the resource when a load of a resource is partially or entirely sponsored based on the credit.

13 Claims, 16 Drawing Sheets

(56) References Cited

U.S. PATENT DOCUMENTS

| | | |
|---|---|---|
| 2008/0201225 A1 | 8/2008 | Maharajh et al. |
| 2008/0228758 A1 | 9/2008 | Aaltonen et al. |
| 2008/0287096 A1 | 11/2008 | Aaltonen et al. |
| 2009/0271778 A1 | 10/2009 | Mandyam et al. |
| 2010/0057801 A1 | 3/2010 | Ramer et al. |
| 2010/0228598 A1 | 9/2010 | Seuken et al. |
| 2010/0306080 A1 | 12/2010 | Trandal et al. |
| 2010/0306311 A1 | 12/2010 | Mahe et al. |
| 2012/0208512 A1 | 8/2012 | Maharajh et al. |

FOREIGN PATENT DOCUMENTS

| | | |
|---|---|---|
| WO | WO 2006/110019 | 10/2006 |
| WO | WO 2006/133345 | 10/2006 |
| WO | WO 2009/142808 | 11/2009 |
| WO | WO 2010/118515 | 10/2010 |

* cited by examiner

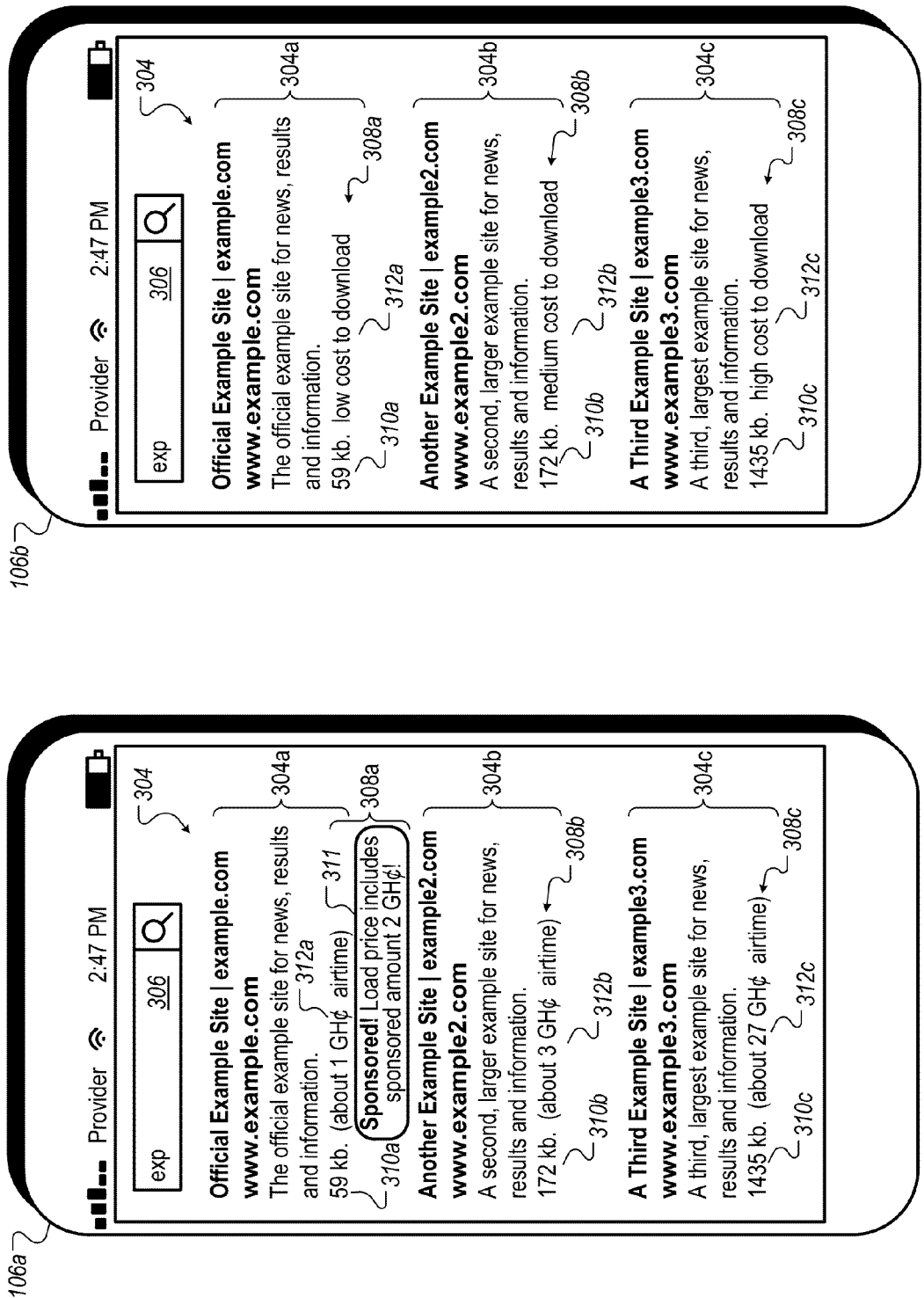

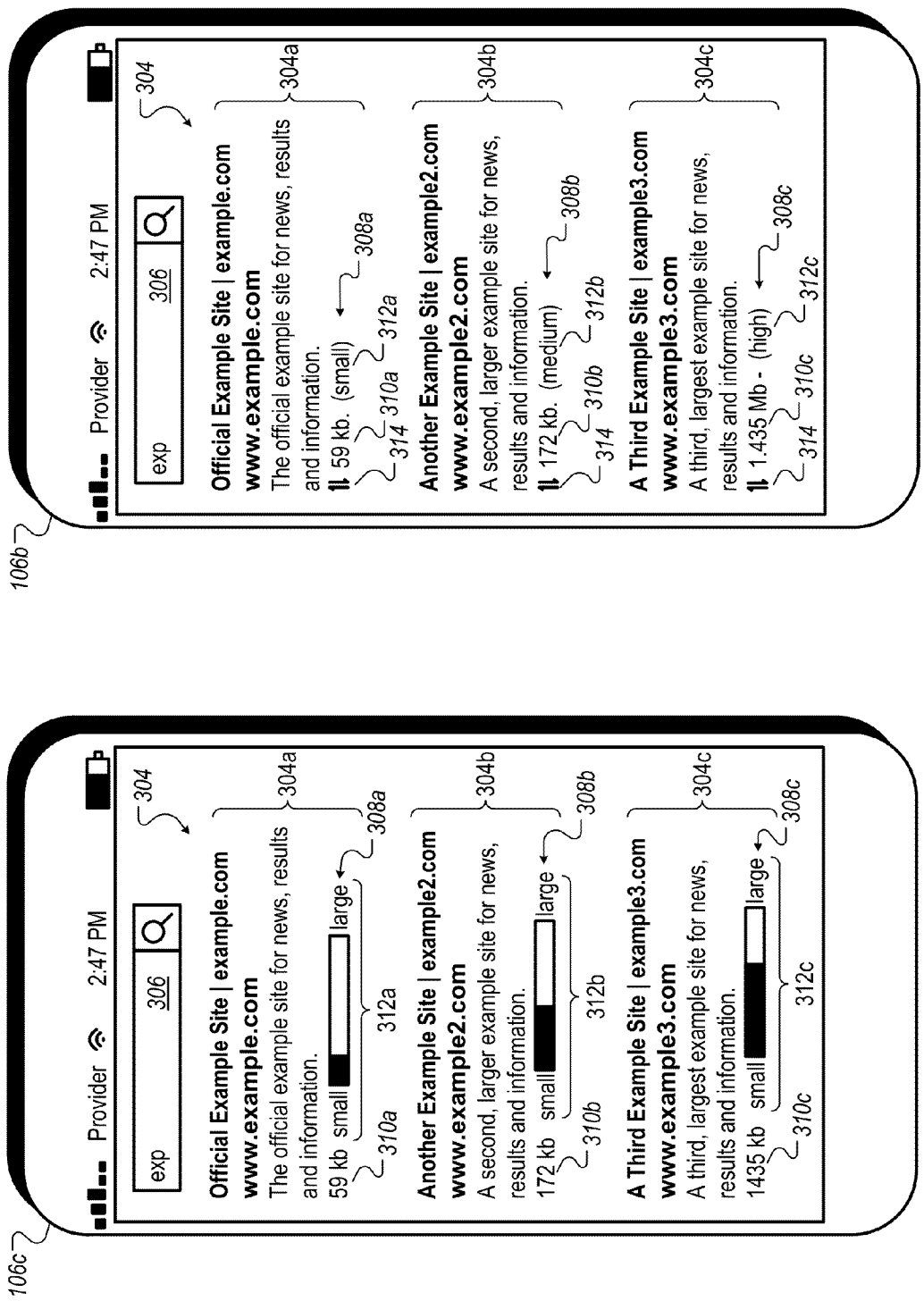

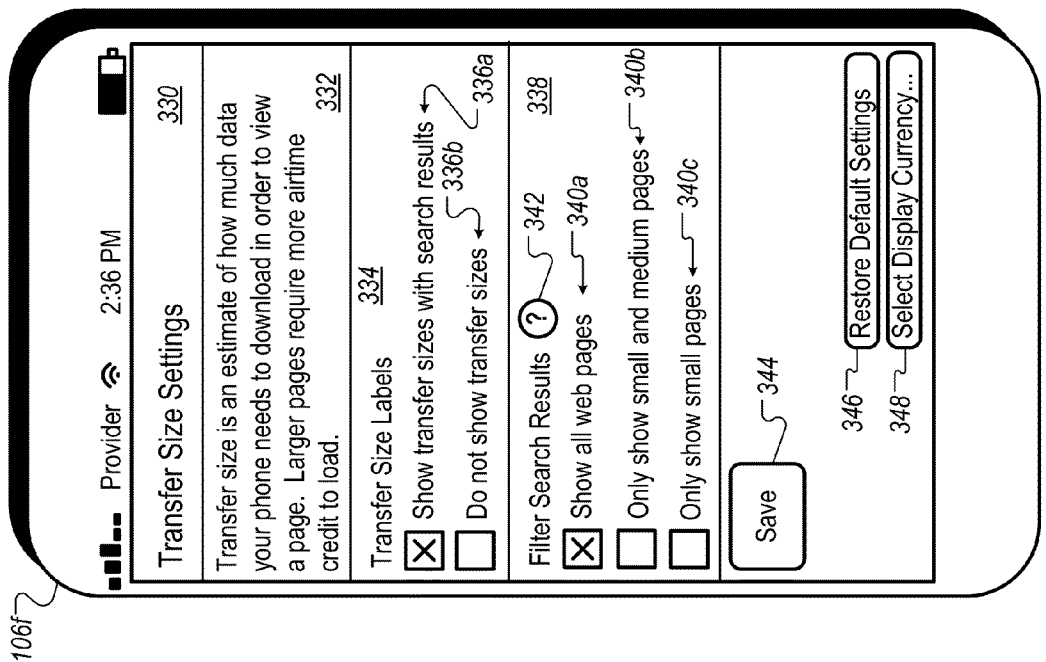
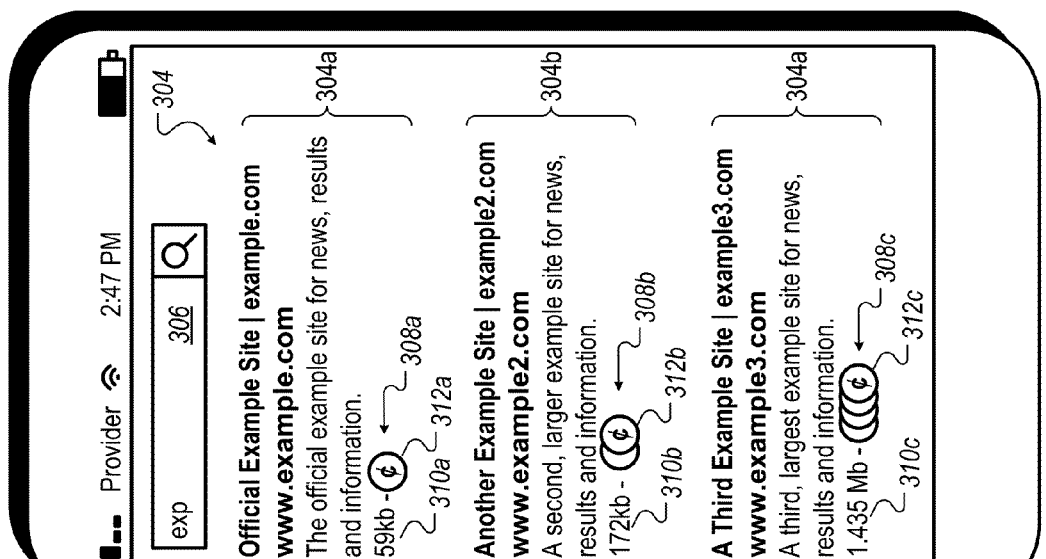
FIG. 3F
FIG. 3E

| Content type | Example rate | Unit |
|---|---|---|
| Web page | | Per page |
| • Small | $0.01 | |
| • Medium | $0.02 | |
| • Large | $0.03 | |
| Image | $0.03 | |
| Video | $0.05 | Per minute viewed |
| Other | | Per minute used |
| • Social Site A | $0.01 | |
| • Email App A | $0.01 | |
| • SSL sessions | $0.01 | |

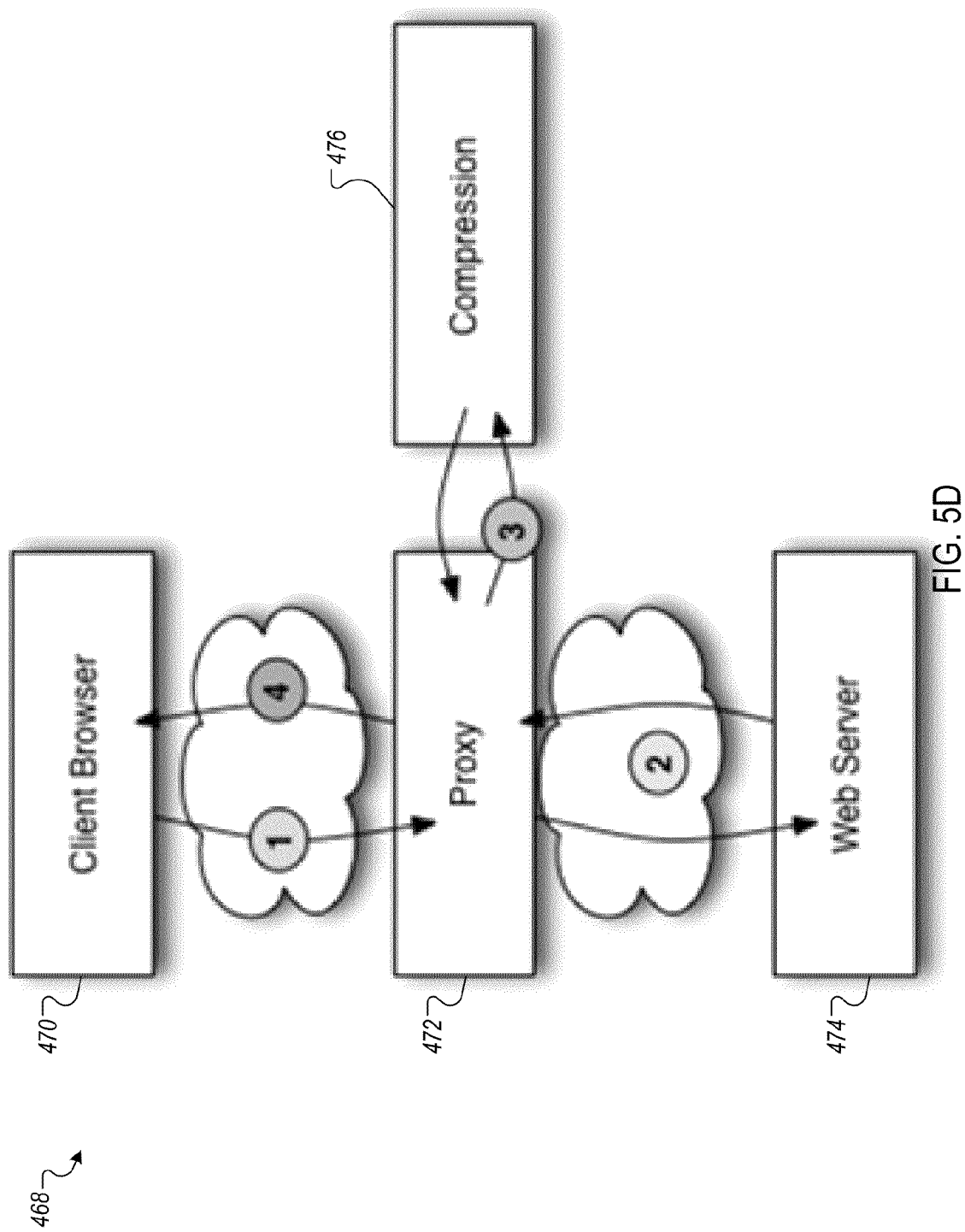

SPONSORING RESOURCE DOWNLOADS

CROSS-REFERENCE TO RELATED APPLICATIONS

This application is a continuation-in-part of and claims priority to U.S. application Ser. No. 13/422,164, titled "Providing Information Prior to Downloading Resources," filed on Mar. 16, 2012, the entire contents of which are hereby incorporated by reference.

BACKGROUND

This specification relates to information presentation.

The Internet provides access to a wide variety of resources. For example, video and/or audio files, as well as web pages for particular subjects or particular news articles, are accessible over the Internet.

Some users employ mobile devices to access information on the Internet. In some circumstances, users may be sensitive to costs associated with data transfers (e.g., access to Internet resources). For example, users that access Internet resources using a metered network (e.g., a mobile network having data rate charges or restrictions) may be less likely to access resources because of, among other things, uncertainties in the cost.

SUMMARY

In general, one innovative aspect of the subject matter described in this specification can be implemented in methods that include a computer-implemented method for providing content. The method comprises receiving a request from a mobile device to load a resource. The method further comprises determining a transmission cost for loading the resource over a metered network. The method further comprises identifying one or more sponsored content items for delivery along with the resource, the sponsored content items being included in one or more slots for presentation along with third-party content associated with the resource, each sponsored content item having an associated bid that represents an amount that will be paid by the sponsor for presentation of a given sponsored content item. The method further comprises determining an amount of credit to be awarded toward load costs based at least in part on the bid. The method further comprises providing a label responsive to the request for presentation on the mobile device that indicates a reduced cost to load the resource when a load of a resource is partially or entirely sponsored based at least in part on the amount of credit that is determined.

These and other implementations can each optionally include one or more of the following features. The method can further comprise determining a minimum threshold revenue required to be provided by a sponsor to a publisher in association with a presentation of a given sponsored content item along with the resource, and determining the amount of credit to be awarded toward load costs can be further based on the minimum threshold revenue, including determining when the bid exceeds the minimum threshold revenue. The amount of credit can be used to reduce the transmission cost, and at least a portion of revenue attributable to the bid for a sponsored content item can be provided to offset the transmission cost. The transmission cost can be offset by credits associated with plural different sponsored content items that are to appear in association with the loaded resource. The method can further comprise presenting an attribution in association with the label when a credit reduces a transmission cost for a resource. Determining a true cost can include determining a true cost from a plurality of carriers. The label can include an estimate of the size based at least in part on historical data associated with the one resource. The label can include an estimated size based at least in part on a retrieval of the one resource by a proxy prior to transmission of data associated with the one resource responsive to the request. The label can include a size estimate and a descriptor of a relative size of the transfer. The label can include a price associated with the data transfer.

In general, another innovative aspect of the subject matter described in this specification can be implemented in methods that include another computer-implemented method for providing content. The method comprises receiving a request from a mobile device for a resource. The method further comprises determining a transmission cost to load the resource over a metered network. The method further comprises determining potential sponsors for reducing a cost to an end user to load the resource, where the sponsor is selected from a publisher associated with the resource or an advertiser associated with one or more slots whose content is to be presented along with third-party content associated with the resource. The method further comprises determining a time to load the resource and a time factor for use in adjusting a transmission price based on demand during a period associated with the time. The method further comprises determining an adjusted transmission price based at least in part on the time factor, any potential sponsors and the transmission cost. The method further comprises providing a label responsive to the request for presentation on the mobile device that indicates a reduced cost to load the resource when a load of a resource is partially or entirely sponsored.

In general, another innovative aspect of the subject matter described in this specification can be implemented in computer program products that include a computer program product tangibly embodied in a computer-readable storage device and comprising instructions. The instructions, when executed by a processor, cause the processor to: receive a request from a mobile device to load a resource; determine a transmission cost for loading the resource over a metered network; identify one or more sponsored content items for delivery along with the resource, the sponsored content items being included in one or more slots for presentation along with third-party content associated with the resource, each sponsored content item having an associated bid that represents an amount that will be paid by the sponsor for presentation of a given sponsored content item; determine an amount of credit to be awarded toward load costs based at least in part on the bid; and provide a label responsive to the request for presentation on the mobile device that indicates a reduced cost to load the resource when a load of a resource is partially or entirely sponsored based at least in part on the amount of credit that is determined.

In general, another innovative aspect of the subject matter described in this specification can be implemented in systems that include a system for providing content. The system comprises a processor a memory. The memory includes instructions that when executed cause the processor to: receive a request from a mobile device to load a resource; determine a transmission cost for loading the resource over a metered network; identify one or more sponsored content items for delivery along with the resource, the sponsored content items being included in one or more slots for presentation along with third-party content associated with the resource, each sponsored content item having an associated bid that represents an amount that will be paid by the sponsor for presentation of a given sponsored content item; determine an amount of credit to be awarded toward load costs based at least in part on the bid; and provide a label responsive to the request for presentation on the mobile device that indicates a reduced cost to load the resource when a load of a resource is partially or entirely sponsored based at least in part on the amount of credit that is determined.

Particular implementations may realize none, one or more of the following advantages. Sponsoring loads (e.g., downloads), including providing users with a reduced price for loading resources, can allow sponsors to reach more users, including users who are sensitive to prices charged by carriers to download data. Being provided with labels that identify future times of sponsored loads can allow price-sensitive users to manage transmission costs. By sponsoring resources, e.g., subsidizing transmission costs of loading web pages, publishers can receive more user traffic on their web pages, and advertisers can serve more impressions of their advertisements to users who visit the web pages.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3E show example devices displaying search results that include transfer size labels of various kinds.

FIG. 3F shows an example user settings screen for specifying how transfer size labels are used.

FIG. 5C shows a table of example guaranteed rates.

FIG. 5D shows an example environment for compressing information before it is provided to a user device.

Like reference numbers and designations in the various drawings indicate like elements.

DETAILED DESCRIPTION

Figure 1:
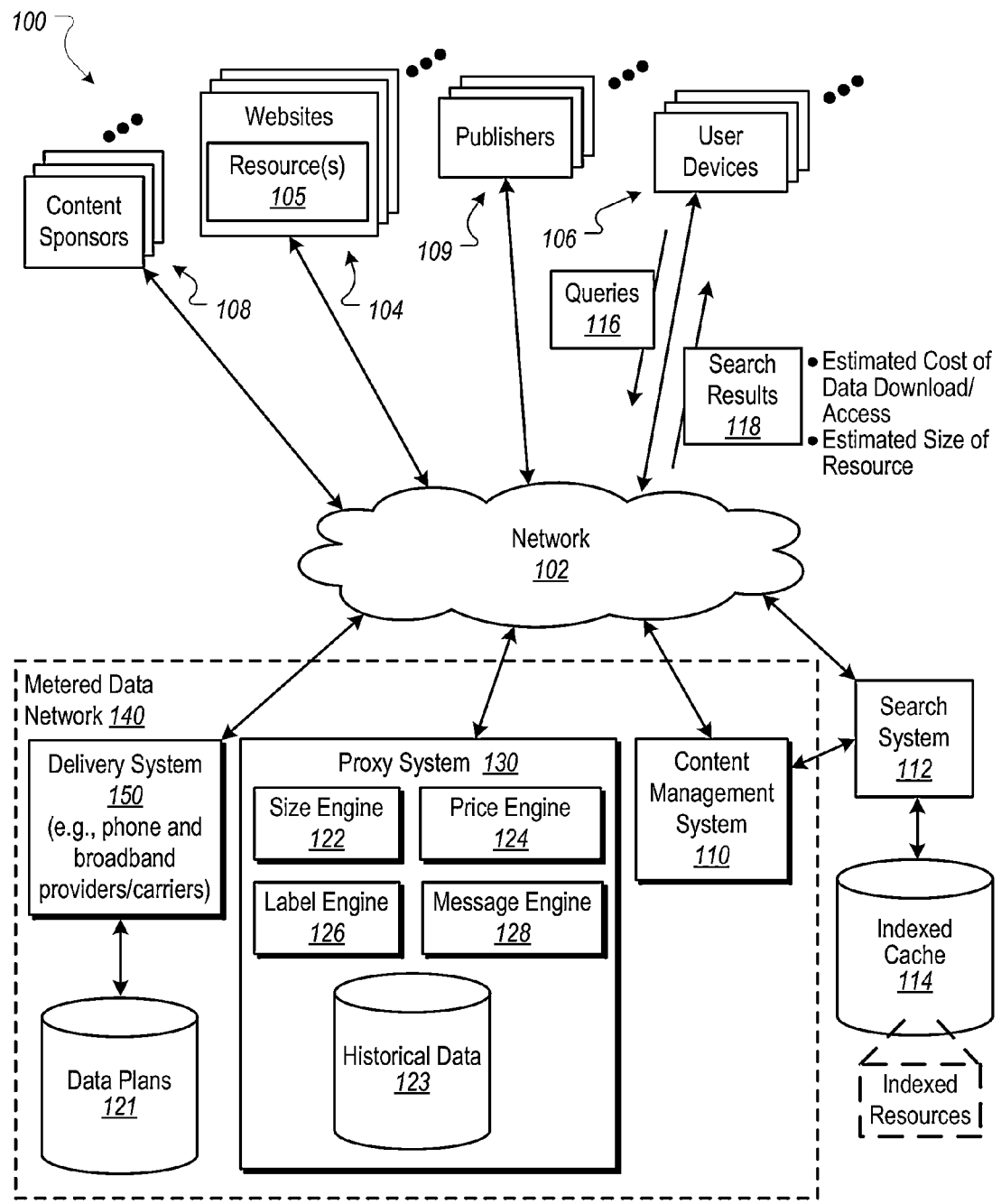
FIG. 1 is a block diagram of an example environment for delivering content.

This document describes methods, processes and systems for pricing data transfers (e.g., downloads) including, for example, providing labels to a user that indicate a reduced transmission cost for transferring data. For example, labels can be presented coincident with the display of search results responsive to a search query. Each label, e.g., can include a reduced cost for transmitting (e.g., downloading) the resource associated with the search result. The reduced page-load cost presented to the user, for example, can appear before the user initiates the load, or may be presented after the load is initiated, e.g., allowing the user to continue (if the price is acceptable) or cancel the operation (if the price is too high). The reduced cost can be based, for example, on sponsorship by a publisher of a resource (e.g., a web page) and/or a content sponsor (e.g., an advertiser associated with an advertisement on the web page). In some implementations, multiple sponsors can affect the price charged to a user for transmitting data (e.g., a resource). In some implementations, reduced transmission costs can be computed for future time periods, e.g., when sponsors have decided to sponsor loads, such as during non-peak activity times. Some implementations can include providing information to the user as to the amount of the sponsorship and/or the identity of the sponsor(s), e.g., so users can learn the source(s) of the sponsorship.

In some implementations, publishers can sponsor an entire web page. For example, the publisher may establish arrangements with carriers to sponsor the web page for mobile users, e.g., that may include price-sensitive users in remote areas. The sponsorship can be a way to incentivize traffic on the web page while giving the users a way to control costs. In some implementations, one or more content sponsors (e.g., advertisers) may also sponsor the web page, e.g., by including in their bids an extra amount to cover part or all of cost of transmission (e.g., downloading the web page when the web page displays their advertisements). In some implementations, publishers and/or content sponsors may place limits on the number of sponsorships, e.g., N users over a particular time period, or sponsorships that total a particular monetary amount. In some implementations, brand owners may elect, for example, to sponsor all or a set of web sites in a domain. For example, Brand X advertisers may sponsor all of the web pages in a domain related to cars in order to reach mobile users who are known historically to like Brand X products if they also like cars.

While many of the examples presented herein focus on transmission costs associated with loading/downloading a resource, the methods, processes and systems can also apply to other types of transmissions. For example, users can be presented with labels that identify the cost for forwarding information (e.g., forwarding email or other information to another user) and/or sending information (e.g., to an address associated with an online entity). In these and other implementations, sponsors such as publishers and content sponsors (e.g., advertisers) can agree to pick up part or all of the cost for such transmissions.

For example, if a user enters a search query on a mobile device (e.g., a cell phone, a tablet computing device, or some other device), the responsive search results can include size estimate labels. The labels, for example, can provide the user with a size estimate and/or a price estimate. The estimates can indicate to the user a relative size or cost associated with a transfer of data if the user selects the search result, thus causing the corresponding resource to be downloaded to the user's phone. Size estimates, for example, can be absolute (e.g., an actual numbers of bytes or bits), relative (e.g., "small," "medium" or "large"), or presented in other ways. Price estimates can be based on the size estimates and may vary depending on the user's phone and/or data plan, the time of day, the location of the user, and other factors. Based on the information presented, the user may decide whether or not to select a particular search result, e.g., if downloading the corresponding resource is worth the estimated price (or is affordable by the user). Users can use the size estimate labels to control costs, e.g., down to the penny (or the user's local currency).

In some implementations, the size estimate labels may not be presented with the search results, but the information may be made available to the user automatically or upon user initiation. In some implementations, the user can use a control on the user device to prompt the display of the label information (e.g., the user may hover over the search result, and the corresponding size estimate label can be displayed). In some implementations, the user can select a particular search result, and instead of automatically downloading the resource, a size estimate label can be presented to the user. In this example, the user can make a choice, based on the displayed information, whether or not to proceed with the download.

While reference is made to search results, the information labels can be provided in other situations where data is attempted to be loaded in, for example, a metered data network. For example, the information label can be presented in conjunction with the selection of a resource on a page or with any request for data over the metered data network. In addition, an information label can be provided as part of the contents that are displayed to a user, where labels can be provided for each reference to a resource (e.g., a link on a page).

In some implementations, a spot market opportunity can be supported. For example, if a carrier's traffic is underutilized, estimates for traffic to be transferred over the network associated with the carrier can be lowered automatically, e.g., so as to encourage data transfers in the network.

While estimated sizes and prices mentioned herein are described using examples of data transfers in the form of downloads of resources, other data transfers are also within the scope of this disclosure. For example, the same or different sizes and prices can be associated with re-publishing content, such as if the user decides to share content with other users. In this example, the user can be presented with a label associated with re-publishing the content and can make the decision to re-publish or not based on the estimated price.

In some implementations, third-party sponsors can sponsor organic content page downloads that are free to the user, e.g., removing any financial concerns that the user may have about being able to afford the airtime or bandwidth costs of accessing the content over a metered network. For example, such organic content pages that are free for downloading by the user can be marked with a zero-cost label and/or highlighted in some other way. In some implementations, the third-party sponsors can target specific countries, user groups and/or content types. For example, a private foundation may be interested in sponsoring public health content to certain groups of people in Africa or other regions.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), content publishers 109, and the content management system 110. The example environment 100 may include many thousands of websites 104, user devices 106, content sponsors 108 and content publishers 109.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones and tablet devices), set-top boxes, television sets, and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. As described above, the search results page can include, for example, additional information in the form of one or more labels related to a size and/or price associated with accessing a noted resource. Search results pages can also include one or more slots in which other content items (e.g., ads) can be presented.

In some implementations, the environment 100 can include plural data stores. For example, a data store of historical data 123 can store, for each resource 105 that has been downloaded within the environment 100, the size of the resource (e.g., in bytes or bits). In some implementations, the size information can be stored each time a user selects a search result 118, thereby initiating the download of the associated resource 105. Because resources 105 can change over time in size and content, some implementations of the historical data 123 can store the size of the most recently-loaded version of the resource 105, an average size of the last few downloads (e.g., the last 2-10), or some other representative size.

In some implementations, a data store of data plans 121 can include information about each user's rate information, which can include, for example, a price per N bytes of downloaded resources and/or air time. In some implementations, the data plans 121 can be assembled from information provided through partnerships or arrangements with various carriers or any other service providers that provide access to resources 105 by users.

In some implementations, the environment 100 can include a proxy system 130 that operates within a metered data network 140 to provide (and track the delivery of) content according to agreed-upon rates. The proxy system 130 can include plural engines. For example, a size engine 122 can determine an estimated size for a particular resource, e.g., by using past download size information for the resource in the historical data 123 or by loading the resource in real time. A price engine 124 can use the estimated size to determine an estimated price associated with the data transfer (e.g., a download). For example, the estimated price can depend on multiple factors including, for example, the size of the resource, the data transfer rate associated with a user downloading the resource, the time of day (e.g., peak vs. non-peak rates), and/or other factors. In some implementations, the price that is determined for each user can be based on information for that user in the data plans 121. A label engine 126 can generate labels using size information from the size engine 122 and price information from the price engine 124. In some implementations, if no size/price information is available, then the label engine 126 can generate a label that indicates uncertainty about the size and price. In some implementations, a message engine 128 can generate any needed messages that can, for example, be provided with price estimate labels that the user sees.

In some implementations, the price engine 124 can also determine a reduced cost for transmitting specific resources. The reduced cost can be based, for example, on sponsors who have agreed to sponsor part or all of the cost for a user to transmit certain data (e.g., load a resource). Example sponsors include publishers and content sponsors (e.g., advertisers).

In some implementations, the proxy system 130, including its plural engines, can use information from a delivery system 150 to provide labels. Example delivery systems 150 include phone, Internet and broadband providers and/or carriers. Using information provided by delivery systems 150, for example, the price engine 124 can match an estimated size (e.g., determined by the size engine 122) with information from the user's data plan 121 to determine an estimated price of the download. In one example, if a user in Ghana has a data plan that charges one Ghana Cedi for a download of 100 kb or less, then the label for a 59 kb resource (e.g., estimated using historical information) can include corresponding and/or proportional size and price estimates (e.g., "59 kb. (about 1 GH¢ airtime)").

For situations in which the systems discussed here collect or use personal information about users, the users may be provided with an opportunity to opt in/out of programs or features that may collect or use the personal information (e.g., information about a user's account). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 2A:
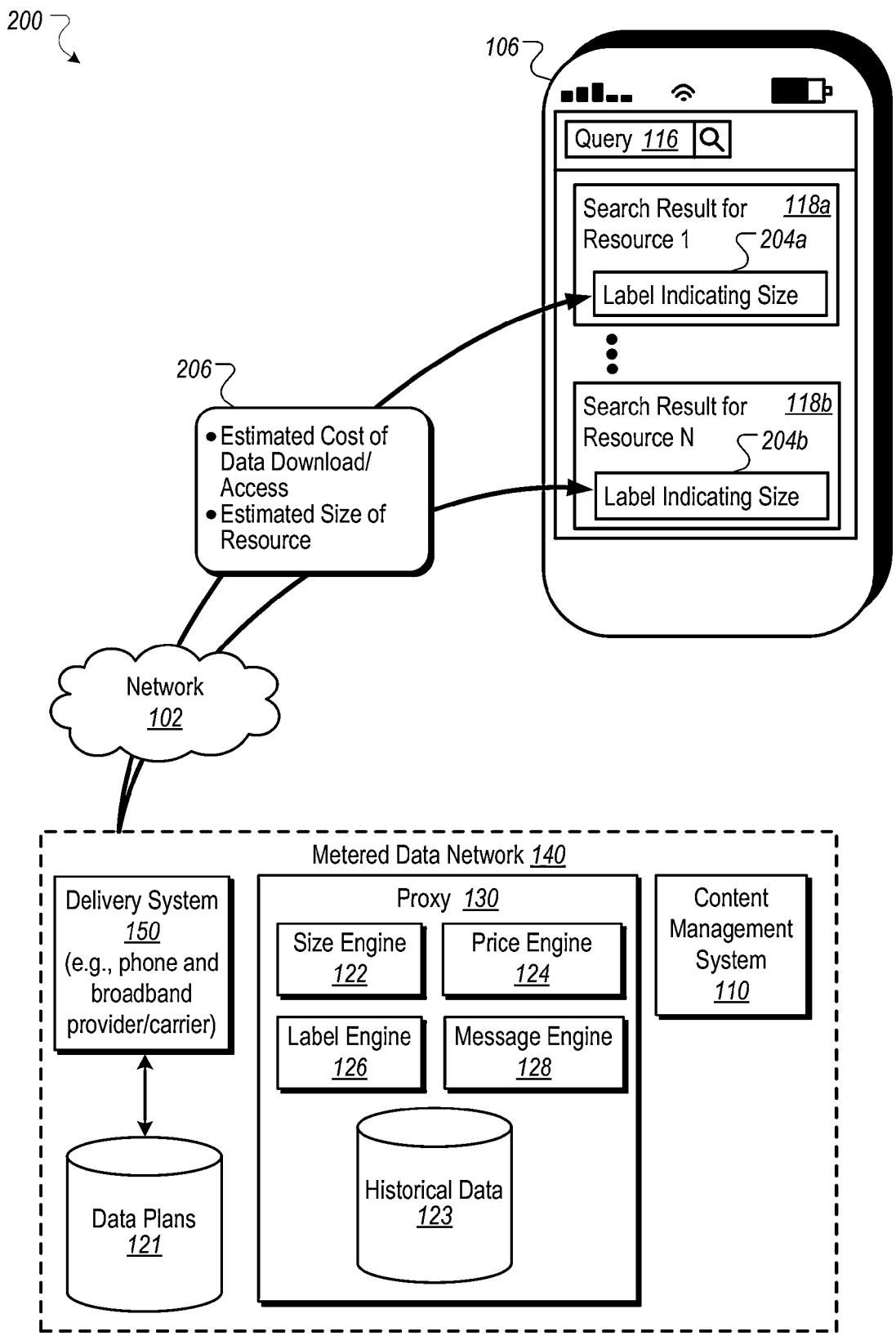
FIG. 2A is a block diagram of an example system for providing a label with a search result that indicates an estimated size of a data transfer of a corresponding resource.

FIG. 2A is a block diagram of an example system 200 for providing a label with a search result that indicates an estimated size of a data transfer of a corresponding resource. For example, labels 204a and 204b can provide size information 206 for the data transfer of each resource associated with search results 118a and 118b, respectively. In some implementations, the size information 206 can include, for example, an estimated price (e.g., in the user's local currency) of a data download or access, an estimated size (e.g., in bits or bytes) of the corresponding resource, or some combination of price- and size-related information. The search results 118a and 118b, for example, can be provided to the user device 106 by the content management system 110 in response to the query 116, as described above.

In some implementations, the estimate of the size and/or price can include determining a size based at least in part on historical data 123. For example, if the resource associated with the search result 118a has in the past averaged 58 Mbytes of data, then the size engine 122 can use this information in estimating a size for any subsequent download. In some implementations, the price engine 124 can use the estimated size to determine an estimated price associated with the download. The label engine 126 can use either or both of the size and price estimates to generate the labels 204a and 204b.

In some implementations, the proxy system 130, including its components, can use information from the delivery system 150 to provide labels. For example, the price engine 124 can match an estimated size (e.g., determined by the size engine 122) with information from the user's data plan 121 to determine an estimated price of the download.

For example, labels 204a and 204b can provide size information 206 for the data transfer of each resource associated with search results 118a and 118b, respectively. In some implementations, the size information 206 can include, for example, an estimated price (e.g., in local currency) of a data download or access, an estimated size (e.g., in bits or bytes) of the corresponding resource, or some combination of price- and size-related information. The search results 118a and 118b, for example, can be provided to the user device 106 by the content management system 110 in response to the query 116, as described above.

In some implementations, the message engine 128 can generate messages that can be provided with the size information 206 provided to the user. For example, if the user's data plan and current usage indicate that the user is approaching (or has exceeded) a threshold, then the message engine 128 can generate an informational message that is also displayable on the user device 106. In some implementations, messages can be displayed in a search results area or can otherwise be available (e.g., as an additional alert icon that is displayed with the size information and that, when hovered over or selected, displays a message to the user). In some implementations, messages displayed to the user can identify the user's current charges and/or remaining data transfer capacity for a current time period.

Figure 2B:
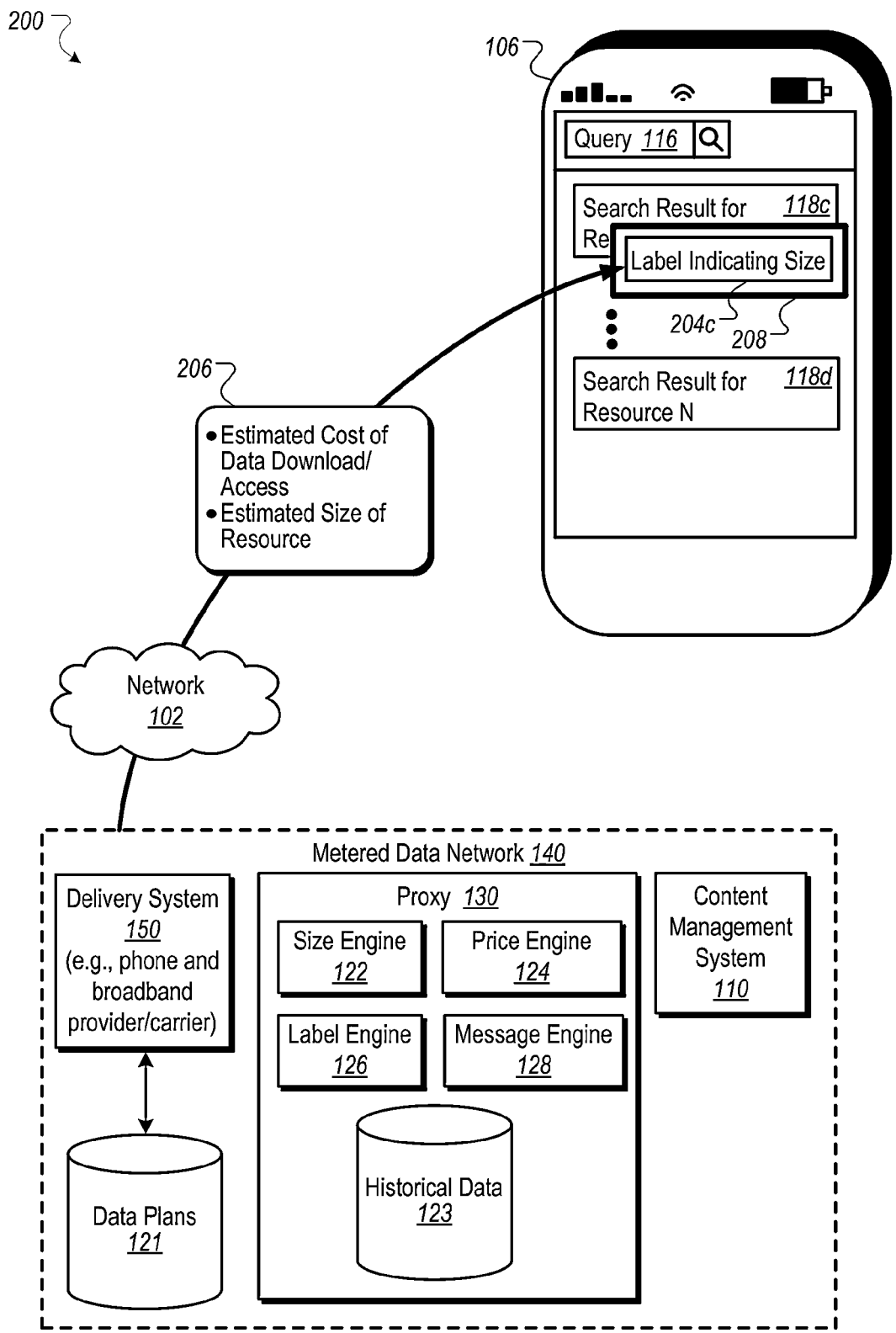
FIG. 2B shows an example presentation of a label that is presented after a resource is selected but before the resource is optionally loaded.

FIG. 2B shows an example presentation of a label 204c that is presented after a resource is selected but before the resource is optionally loaded. For example, search results 118c and 118d, when initially displayed on the user device 106, may not include estimated size information. In some implementations, the size information (e.g., the label 204c) is presented after the user elects to load the resource (e.g., by clicking on or otherwise selecting the search result 118). In some implementations, a warning screen or prompt can be presented to the user in response to selection of a resource which includes the size/price information. Additional selection or default action/inaction may be required in order to initiate the load of the resource. In some implementations, the size information is presented if the user uses a control, such as a control that is activated when a cursor hovers over the search result 118c. Other controls are possible. For example, the size information can be presented, by including the label 204c in a popup 208. Search result 118d, for example, shows an example search result for which the user has not yet selected the resource.

FIGS. 3A-3E show example devices 106a-106e displaying search results 304 that include transfer size labels of various kinds. For example, referring to FIG. 3A, search results 304a-304c (e.g., provided in response to a query 306) include labels 308a-308c corresponding to increasing data transfer sizes (e.g., 59, 172 and 1435 kb). In this example, the labels 308a-308c include size components 310a-310c and price components 312a-312c, respectively. The price components 312a-312 in this example indicate an estimated price associated with the corresponding data transfer of the associated resource that the user can initiate (e.g., if the user believes the data transfer is worth the cost).

In some implementations, prices associated with downloading data can be displayed in a local currency. For example, if the user is currently located in Ghana (e.g., as determined from global positioning system (GPS) capabilities of the user device), then the price component 312a can indicate an estimated price of "about 1 GH¢ airtime" (e.g., expressed in Ghana Cedi). In some implementations, the currency or currencies in which estimated prices are displayed to the user can be a preferred currency of the user, the user's currency-of-record associated with a phone or data plan, or some user-configurable one or more currencies. Price estimates associated with the other search results 304b and 304c can be greater, e.g., "about 3 GH¢ airtime" for 172 kilobytes of data and "about 27 GH¢ airtime" for 1435 kilobytes of data.

Referring to FIG. 3B, the information provided in price components 312a-312c is slightly different than the price components described with reference to FIG. 3A. In this example, instead of using absolute price values (e.g., 1, 3 and 27 GH¢ of airtime), general descriptions or categories are used. For example, the price components 312a-312c can indicate that the expected prices associated the downloading the resources are categorized as "low," "medium" or "high cost to download," respectively.

In some implementations, the way in which the size components 310a-310c and the price components 312a-312c are presented can change (e.g., by using color-coding or other techniques) based on the relative size and/or price. For example, the size component 310a and the price component 312a for the smaller resources can be displayed in blue or green (e.g., indicating a smaller price), and increasingly hotter colors (e.g., shades of yellow and red) can be used to display size components and price components of increasingly larger resources. Color-coding such as described in this example can be used with other size components and price components described herein. Sizing or other means of emphasis of the information can also be used to reflect relative size/cost of the transfers.

Referring to FIG. 3C, the information provided in price components 312a-312c is slightly different than the price components described with reference to FIGS. 3A and 3B. For example, the price components 312a-312c in this example include bar graphics, where the length of the darkened area of the bar can indicate a relative expected size/price, e.g., substantially proportional to the size of the bar. In some implementations, color-coding can be used, e.g., by using cool colors (e.g., blues and greens) for the bars associated with smaller expected prices, and red for the bars associated with larger expected prices. In some implementations, the bar graphic can include label markings "small" and "large" to provide a measure of scale.

Referring to FIG. 3D, price components 312a-312c include a download icon 314. Other icons can be used. The price components 312a-312c in this example omit the bar graphics shown in FIG. 3C but still include general categories of small, medium and large.

Referring to FIG. 3E, price components 312a-312c include coin symbols, where the number of coin symbols varies and is substantially proportional to estimated sizes/prices of the corresponding downloads. For example, the price components 312a associated with 59 kb includes one coin symbol, while the price components 312b and 312c (e.g., for larger estimated download sizes) include two and four coin symbols, respectively. Other symbols, icons or graphics can be used. In some implementations, the coin symbols can include abbreviations or other indicators of the user's local currently. In some implementations, in addition to the coin symbols, the actual estimated prices can also be shown. In some implementations, partial or fractional coin symbols can be used, e.g. to indicate fractions of GH¢ of airtime. In some implementations, the number of coin symbols can correspond to a geometric progression of prices, e.g., with one coin representing one GH¢, two coins representing N GH¢ (where N>2), three coins representing N*N GH¢, and so on. In this example, hovering over the coin symbols can cause the actual price to be displayed.

While the examples in FIGS. 3A-3E show example labels that are displayed within search results, the same labels or different labels can be provided when a resource is selected or otherwise presented. For example, any of the labels or different labels can be presented when the user selects the search result or any presented resource, providing the user with an option to complete the data transfer after being presented with the associated size/price information.

FIG. 3F shows an example user settings screen 330 for specifying how transfer size labels are used. For example, the user settings screen 330 can appear upon user selection of an option available on user device 106f, or at initial system start-up or initialization of a device. In some implementations, the user settings screen 330 can include an explanation 332 that describes how the transfer size labels work. For example, the explanation 332 can describe how the settings, based on user preferences, may affect whether and how labels such as the labels 308a-308c are to be displayed with search results or other presentations of resources or data transfer opportunities, as well as whether popups or other controls such as the popup 208 are used.

In some implementations, the user settings screen 330 can include a show settings area 334, e.g., that includes check boxes, radio buttons or other controls for specifying when transfer size/price labels should appear. For example, a "Show transfer sizes with search results" option 336a, if selected, can enable the display of transfer size labels, such as the labels 308a-308c described above with reference to FIG. 3A-3E. In another example, a "Do not show transfer sizes" option 336b, if selected, can disable the display of all transfer size labels. Other user-selectable options can also exist.

In some implementations, the user settings screen 330 can include a search results filter area 338, e.g., that includes check boxes, radio buttons or other controls for specifying how search results are to be filtered based on the transfer size of the corresponding resources. For example, a "Show all web pages" option 340a can allow all search results to appear in the search results (e.g., search results 304) that are displayed in response to a query (e.g., the query 306). A user may select this setting, for example, to display all search results regardless of the estimated price of a data download if the user were to click on or otherwise select the search result. In some implementations, an "Only show small and medium pages" option 340b can allow the user to limit the search results to the less expensive estimated price related resources (e.g., preventing high-price pages). In some implementations, an "Only show small pages" option 340c can allow the user to limit search results that are shown to the least expensive category of expected prices. In some implementations, additional controls can be provided by which a user can specify an absolute monetary amount as the threshold amount, e.g., to prevent the display of search results for which downloading the resource would exceed that threshold amount. For example, a cost-conscious user in Ghana may set the threshold at 3 GH¢ to limit search results displayed to those having an estimated price of "about 3 GH¢ airtime" or less. In some implementations, informational controls such as a control 342, if selected, can provide information to the user as to how the user settings are set and how they operate.

In some implementations, the user settings screen 330 can include additional controls. For example, a save control 344 can be selected by the user to save any settings and/or inputs made on the user settings screen 330. A "Restore Default Settings" control 346 can be used to reset the checkboxes and other settings to a default value, e.g., that accompany the user device 106f upon initial receipt by the user. In some implementations, a "Select Display Currency . . . " control 348 can be used to specify (e.g., using a list or a pop-up) the one or more currencies in which the user wishes to have labels 308a-308c displayed (e.g., in a local currency and/or currencies designated by the user).

Figure 4A:
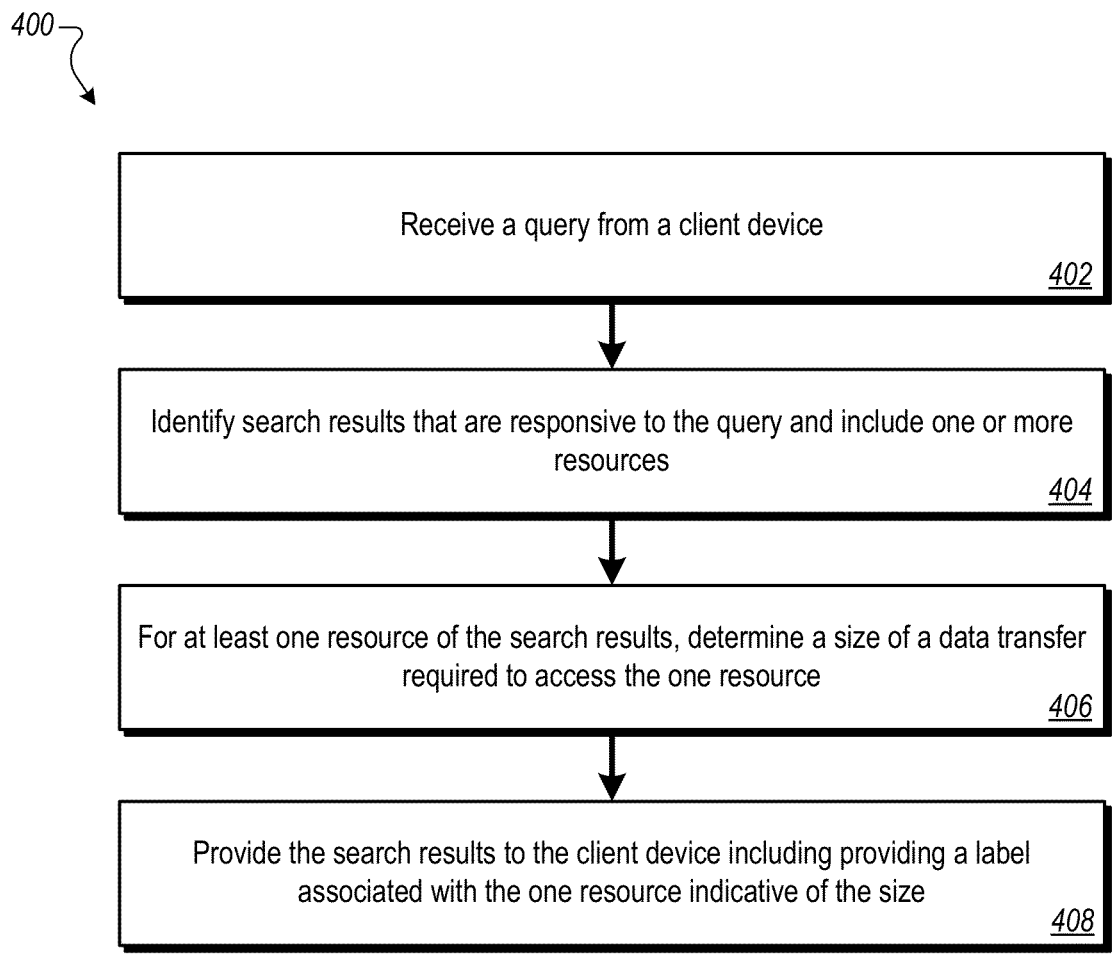
FIG. 4A is a flowchart of an example process for providing a label with a search result that indicates an estimated size of a data transfer of a corresponding resource.

FIG. 4A is a flowchart of an example process 400 for providing a label with a search result that indicates an estimated size of a data transfer of a corresponding resource. The process 400 can be performed by the content management system 110 and/or the proxy system 130 (and/or its components). FIGS. 1, 2A and 3A-3E are used to provide example structures for performing the steps of the process 400.

A query is received from a client device (402). For example, the content management system 110 can receive the query 116 from any of the user devices 106a-106e. The query can originate, for example, from a browser on a mobile user device (e.g., a cell phone, a tablet computing device, or some other device) operated by a user in a remote part of Africa (e.g., Ghana).

In some implementations, the query can be initiated by the user as a voice request. Other prompts for information can be manually or automatically activated. For example, a feature phone can include a rudimentary menu with predefined search categories (e.g., weather, scores, prices, etc.). When the user activates one of these menus, the application can conduct a request using the predefined information. The entire sequence of user selections and intermediate results can be price-labeled as well. For example, if the user's selection is a weather category, each weather-related option presented to the user can have an estimated size and price, such as an option to display today's forecast. Once that selection is made by the user, additional price-labeled options can be presented, such as along with the display of the current weather information for any other resource referenced on a page that includes the requested weather information.

In some implementations, the query can be initiated as a result of the user employing an interactive voice response (IVR) system. For example, the user in Africa can call into the IVR system and either navigate to pre-recorded information (e.g., weather, sports scores, etc.) or use a voice-driven system to ask a question or perform a search. The use of an IVR system can also have associated prices, e.g., prompting the user with the price before presenting the information.

Responsive to the query, search results are identified including one or more resources (404). As an example, the content management system 110 can provide the search results 304.

For at least one resource of search results, a size of a data transfer required to access the one resource is determined (406). For example, the size engine 122 can determine an estimated size for the resource. Further, the price engine 124 can determine a corresponding estimated price, and the label engine 126 can generate a label indicative of the estimated size and/or estimated price.

The search results are provided to the client device including providing a label associated with the one resource indicative of the size/price (408). As an example, the search results 304a-304c can be provided to the any of the user devices 106a-106e (e.g., the user's mobile device in Africa), including the labels 308a-308c. As a result, the user in Ghana can see size and/or price estimates that apply to the potential data transfer (e.g., downloading of each of the resources) corresponding to the search results 304a-304c.

The labels 308a-308c can include, for example, size estimates (e.g., size components 310a-310c) and a descriptor of a relative size of the transfer (e.g., the bar graphics and/or small/medium/large annotations described with reference to FIGS. 3C-3D). For example, the descriptor can include a slider ranging from small to large, where the position of the slider is associated with the estimated size. Each descriptor can reflect a particular category (e.g., small, medium, or large) within a range of possible categories that are attributable based on the size estimate.

In some implementations, descriptors can identify a category of resource associated with the search result, e.g., as a way for the user to gain knowledge of the type of resource that may contribute to its corresponding size. For example, the descriptor can identify the resource as including one or more of the categories of video, images, audio, flash content, applications including embedded applications, rich content, fonts and/or scripts.

In some implementations, the label includes an estimate of the size based at least in part on historical data associated with the one resource. For example, the size engine 122 can access historical data 123 to determine the size of the resource that was reported or recorded the last time (or previous times) that the resource was downloaded. In some implementations, size can include (or be an average of) multiple sizes corresponding to multiple downloads of the same resource. As a result, the label can include an estimate of the size based at least in part on prior loads of the one resource.

In some implementations, the label includes an estimated size based at least in part on a retrieval of the one resource by a proxy prior to transmission of data associated with the one resource responsive to the request. For example, instead of accessing information about prior loads of the resource, the proxy system 130 can retrieve the resource and determine its size (e.g., before the user elects to download the resource).

In some implementations, the label can include a price associated with the data transfer. For example, the price can be the price that the user in Africa would be charged by the user's phone carrier for transferring the size or amount of data in accordance with a user's data plan with the phone carrier. In some implementations, the price identified in the label can be the current price, e.g., for an immediate download of the resource. In some implementations, the price can include an indication of a price that will be charged to load the data at a future time. For example, the label that the user sees can identify a price for downloading the resource later, e.g., during off-peak hours or some other identified time. In some implementations, the label that is presented to the user can include plan usage data, e.g., indicating an amount of data loaded in a given time period (e.g., "You have loaded 987 kb of data so far this month, costing 32 GH¢ of airtime"). In some implementations, the label that is presented to the user can indicate an amount of remaining data that can be loaded in a given time period after loading the one resource (e.g., "If you load this resource, you will still have 17 GH¢ of airtime left for the month").

In some implementations, the price associated with the data transfer can be the price charged by the delivery system 150 (e.g., the user's phone carrier) associated with the client device that is used to present the one resource based at least in part on the size. For example, the price that the user sees can be the price that will be charged under the user's data usage plan.

In some implementations, if the user selects a search result and the corresponding resource is downloaded, that resource can include multiple embedded links. In some implementations, each of the embedded links can be augmented to include a label that is visible, for example, upon user selection of a link associated with the resource. For example, after the user selects a link, the label that is displayed can indicate a size of a link resource associated with the link (e.g., including the cost of the user downloading the resource).

Figure 4B:
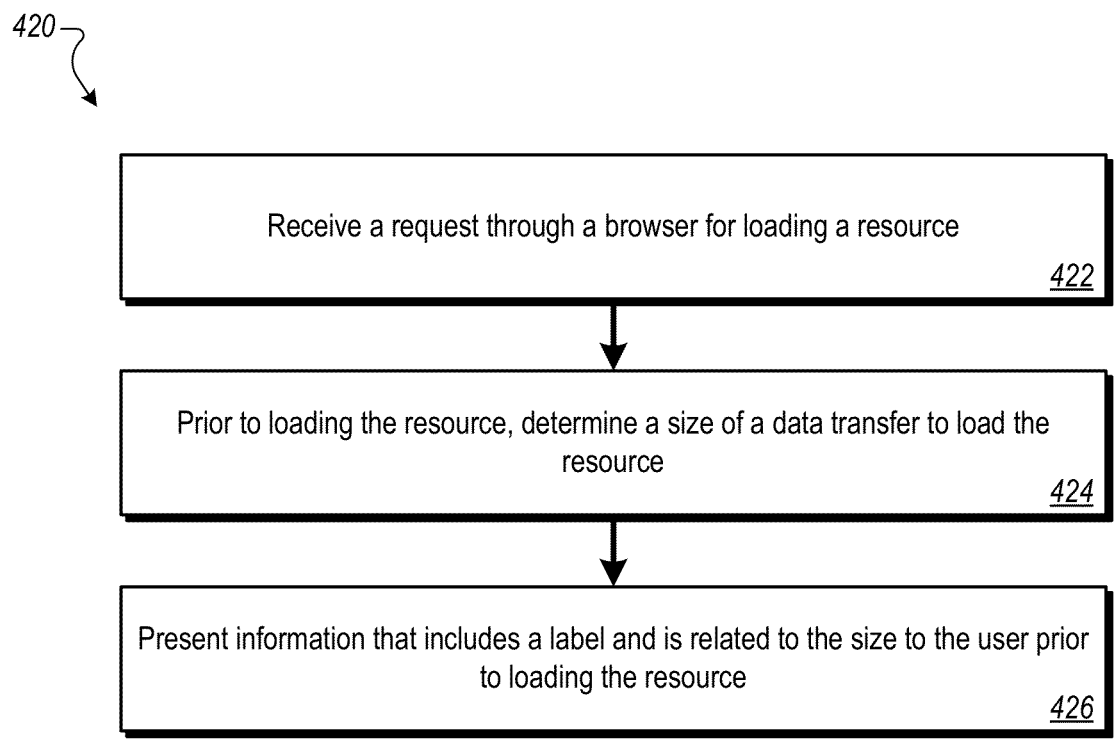
FIG. 4B is a flowchart of an example process for providing a label indicating an estimated transfer size of a resource after it is selected but before it is loaded.

FIG. 4B is a flowchart of an example process 420 for providing a label indicating an estimated transfer size of a resource after it is selected but before it is loaded. The process 420 can be performed by the content management system 110 and the proxy system 130 (and/or its components). FIGS. 1 and 2B are used to provide example structures for performing the steps of the process 420.

A request is received through a browser for loading a resource (422). For example, referring to FIG. 2B, the request can occur when the user selects the search result 118c. In some implementations, the request can be a voice request. For example, the request can be initiated as a result of the user employing an interactive voice response (IVR) system. For example, the user in Africa can call into the IVR system and either navigate to pre-recorded information (e.g., weather, sports scores, etc.) and make a selection of an option.

In some implementations, if the user is using a feature phone, the request can be a selection from a rudimentary menu with predefined search categories (e.g., weather, scores, prices, etc.). When the user activates one of the menu options, the application can initiate a request using the predefined information.

Prior to loading the resource, a size of a data transfer to load the resource is determined (424). As an example, the size engine 122 can determine an estimated size for the resource. Further, the price engine 124 can determine a corresponding estimated price, and the label engine 126 can generate a label indicative of the estimated size and/or estimated price.

Information that includes a label and is related to the size is presented to the user prior to loading the resource (426). As an example, referring to FIG. 2B, the size information can be presented in a popup 208 using the label 204c. In some implementations, the label 204c can include, for example, size estimates and a descriptor of a relative size of the transfer (e.g., the bar graphics and/or small/medium/large annotations described with reference to FIGS. 3C-3D). For example, the descriptor can include a slider ranging from small to large, where the position of the slider is associated with the estimated size. Each descriptor can reflect a particular category (e.g., small, medium, or large) within a range of possible categories that are attributable based on the size estimate. In some implementations, descriptors can identify a category of resource associated with the search result, e.g., video, images, audio, flash content, applications including embedded applications, rich content, fonts and/or scripts. Other categories are possible.

In some implementations, the label includes an estimate of the size based at least in part on historical data associated with the one resource, e.g., as determined by the size engine 122 using historical data 123 corresponding to prior loads of the resource. In some implementations, the label includes an estimated size based at least in part on a retrieval of the one resource by a proxy prior to transmission of data associated with the one resource responsive to the request. For example, the proxy system 130 can retrieve the resource and determine its size in real time.

In some implementations, the label can include a price associated with the data transfer, such as the price that the user would be charged by the user's phone carrier for the data transfer, e.g., based on rates associated with the user's data plan. In some implementations, the price identified in the label can be the current price for an immediate download or a price that would be charged to load the data at a future time. In some implementations, the label that is presented to the user can include plan usage data, e.g., indicating an amount of data loaded in a given time period and/or an amount of remaining data that can be loaded in a given time period after loading the one resource.

In some implementations, the price associated with the data transfer can be the price charged by the delivery system 150 (e.g., the user's phone carrier). For example, the price that the user sees can be the price that will be charged under the user's data usage plan if the user downloads the resource.

In some implementations, if a search result is downloaded that includes one or more embedded links, each embedded link can include or be associated with a label that is visible, for example, upon user selection of a link. For example, after the user selects a link, the label that is displayed can indicate a size of a link resource associated with the link (e.g., including the cost of the user downloading the corresponding resource).

Figure 4C:
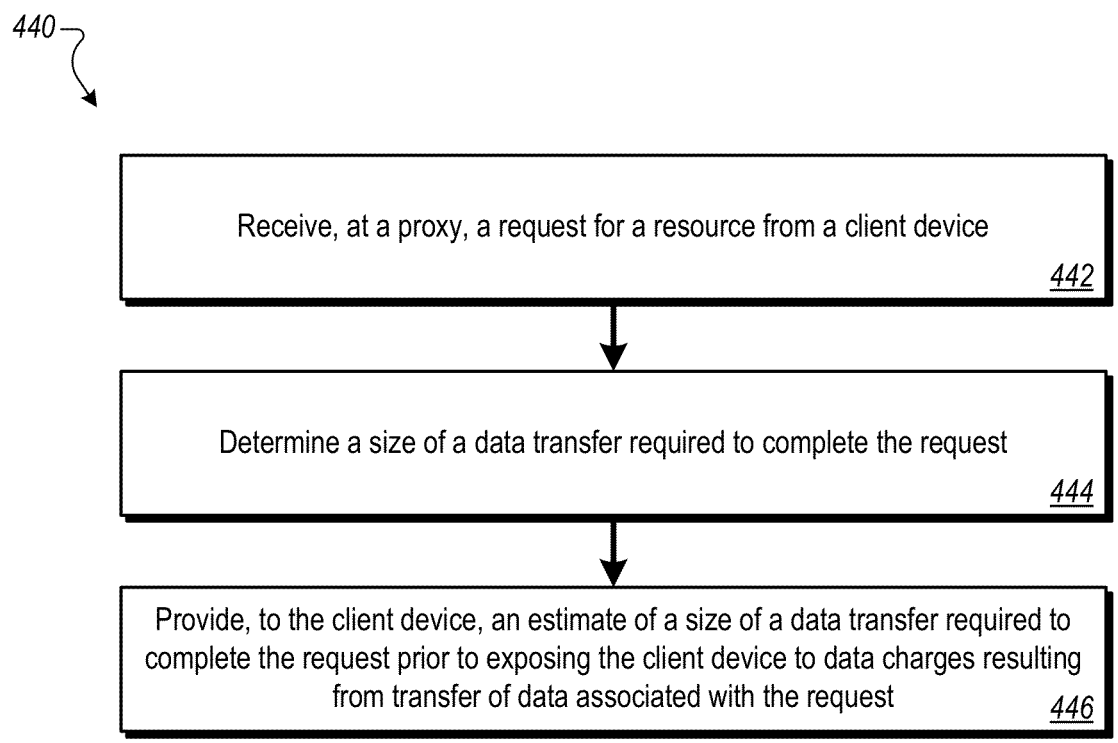
FIG. 4C is a flowchart of an example process in which a proxy provides an estimated size for a data transfer of a resource.

FIG. 4C is a flowchart of an example process 440 in which a proxy provides an estimated size for a data transfer of a resource. For example, the process 440 can be used for resources associated with browsers (e.g., the cost of downloading resources associated with search results that are responsive to a query), email systems (e.g., the cost of downloading a full email message that corresponds to an email subject/header displayed in an inbox), or any other resource that can be transferred within a metered data network. The process 440 can be performed by the content management system 110 and the proxy system 130 (and/or its components). FIGS. 1 and 2B are used to provide example structures for performing the steps of the process 440.

A request is received at a proxy for a resource from a client device (442). For example, referring to FIG. 2B, the proxy system 130 (e.g., in combination with the content management system 110) can receive a request for the resource associated with the search result 118c.

A size of a data transfer required to complete the request is determined (444). The size engine 122, for example, can determine an estimated size of the resource, e.g., based at least in part on historical data 123, as described above.

An estimate is provided to the client device that is an estimate of a size of a data transfer required to complete the request prior to exposing the client device to data charges resulting from transfer of data associated with the request (446). For example, the proxy system 130 (e.g., in combination with the content management system 110) can provide the estimated size to the user device 106.

In some implementations, providing the estimate can include determining a size based at least in part on data received from the resource when the proxy requests a load of the resource. For example, the proxy system 130 can use information in the resource to determine an estimated size, e.g., by examining the resource's size using file size utilities or by determining the size by loading or pre-loading the resource. Providing the size estimate, for example, can occur prior to delivery of data associated with the resource to the client device.

In some implementations, the process 440 can further include additional operations of passing the request from the proxy to the resource; receiving data from the resource responsive to the request; determining a size associated with one or more resources referenced in the received data; and providing size data associated with the one or more referenced resources along with the received data to the client device. For example, the proxy system 130 can obtain and estimate size for the requested resource (e.g., web page A) then estimate the size of additional resources associated with any links in the resource (e.g., web pages X, Y and Z referenced by the web page A). The proxy system 130 can then provide four estimated sizes, one size for each of the web pages A, X, Y and Z.

In some implementations, the process 440 can further include additional operations of passing the request from the proxy to the resource; receiving data from the resource responsive to the request; and determining a size of the data transfer from the resource based on the received data. For example, the proxy system 130, without obtaining the resource, can request of the resource to either identify its size or provide information by which the proxy system 130 can estimate its size.

As described above, data rate labels based on a size of the data transfer can be provided to a client device prior to the commencement of the download of the data. The price estimates provided in association with the data rate labels can be guaranteed by a service, such as the service that provides the price information. For example, a service can make an advance purchase of data bandwidth or a purchase guarantee with a carrier for a bulk volume of data bandwidth. The purchased data bandwidth can be resold with or without markup, such as to individual users on an a la carte basis. The service can accordingly pass on bulk pricing to the user, while allowing carriers to reduce uncertainty and risk regarding consumption volume, which can enhance their ability to forecast and plan for capacity increases and other capital expenditures. The service can provide solutions (e.g., software) to enable this inter-mediation, including allowing users to use their voice balance rather than maintain a separate voice and data balance. Forecasts of expected consumption can be made on a per user basis through user-specific models based on past individual and community consumption patterns.

One example of a method for providing the guaranteed cost delivery service includes receiving, by a processor, a request for data from an application on a metered data network. The request for data can be a request from a mobile handset for data from a resource that is transferred to the mobile device by a carrier. The user may have a contract with the carrier for voice or data services. In some implementations, the transaction contemplated herein includes a separate agreement with delivery service to engage in the bulk pricing. In some implementations, users can separately sign up for the delivery service. Some or all data transfers to/from the user device can be governed by the separate agreement.

Prior to transferring the data, the delivery service can determine a size of an associated data transfer to satisfy the request. The delivery system can, for example, do this as described above, such as by loading the data to a proxy or evaluating historical information associated with prior loads of the data. The delivery system can present information including price information to be charged by a carrier for transmission of the data based on the size. The price information can reflect an estimated cost to the user.

Upon receiving a confirmation to transfer the data, the price estimate can be honored by the delivery system. To facilitate such, the delivery system can estimate an aggregate amount of data that subscribers will consume in a time period, and establish a bulk price with the carrier for the aggregate amount. Honoring the estimate can include debiting a user's access plan associated with the carrier an amount equal to or less than the estimated price.

The application request can originate from an application executing on a mobile device. The metered data network can be a wireless network. The request for data can be a request from a browser for a resource. The price information can include an estimated cost in a local currency.

The access plan can be a voice plan and debiting the estimated price can include debiting an amount in a local currency against a balance kept in the local currency for voice communications in the metered data network. Alternatively the access plan can be of the form of a data plan or a combined voice and data plan.

Estimating an aggregate amount can include determining a first time period, determining a number of subscribers that have opted in to using bulk pricing, and estimating data usage by the number of subscribers in the first time period.

As described above, data rate labels can be provided at or in association with data requests received from, for example, a mobile device. In some implementations, a spot market can be created by the delivery system (where there conventionally is only a fixed market) for the delivery of data to consumers in the metered network. In some implementations, a capacity auction platform can be created to enable carriers to sell excess capacity at floating prices. The delivery system can use historical information about data consumption at price points to discern a single or group of user's individual price sensitivity curve. Using the price sensitivity curve information, the delivery system can determine, for example, price sensitive users and how specific changes in price at a specific time will drive changes in usage. A mechanism for surfacing these carrier offers can use data rate labels. Users will not need to submit a bid; instead, rate labels for price-sensitive users will automatically change (downward or upward), thereby embodying the offer from the carrier and stimulating or effectively pricing consumption.

In some implementations, the delivery system can provide tools for carriers, such as the ability to set a target utilization rate, or specific price bands for specific times of the day, to determine the carrier's offers. Based on these targets, the delivery system can adjust the data rate label price estimates in order to drive toward a targeted consumption goal for a given time period.

Figure 4D:
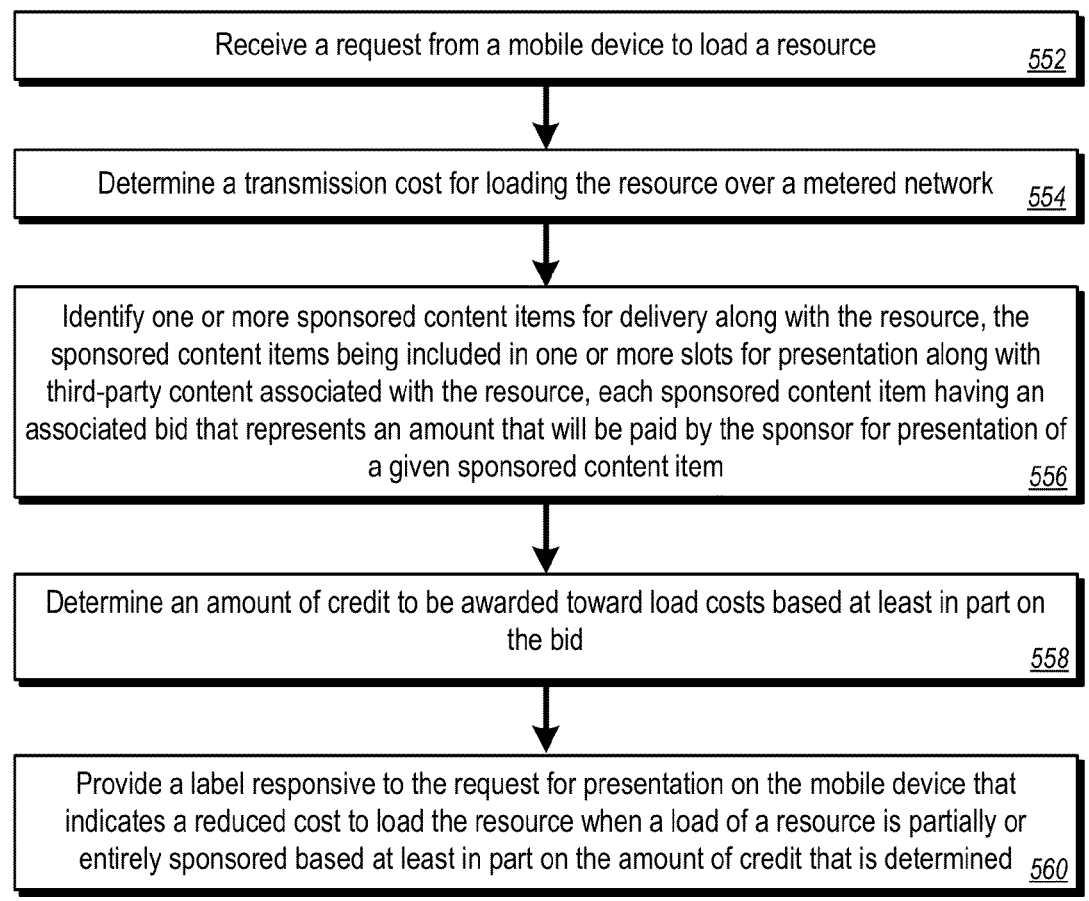
FIG. 4D is a flow chart of an example process for presenting sponsorship information associated with loading resources.
Figure 4E:
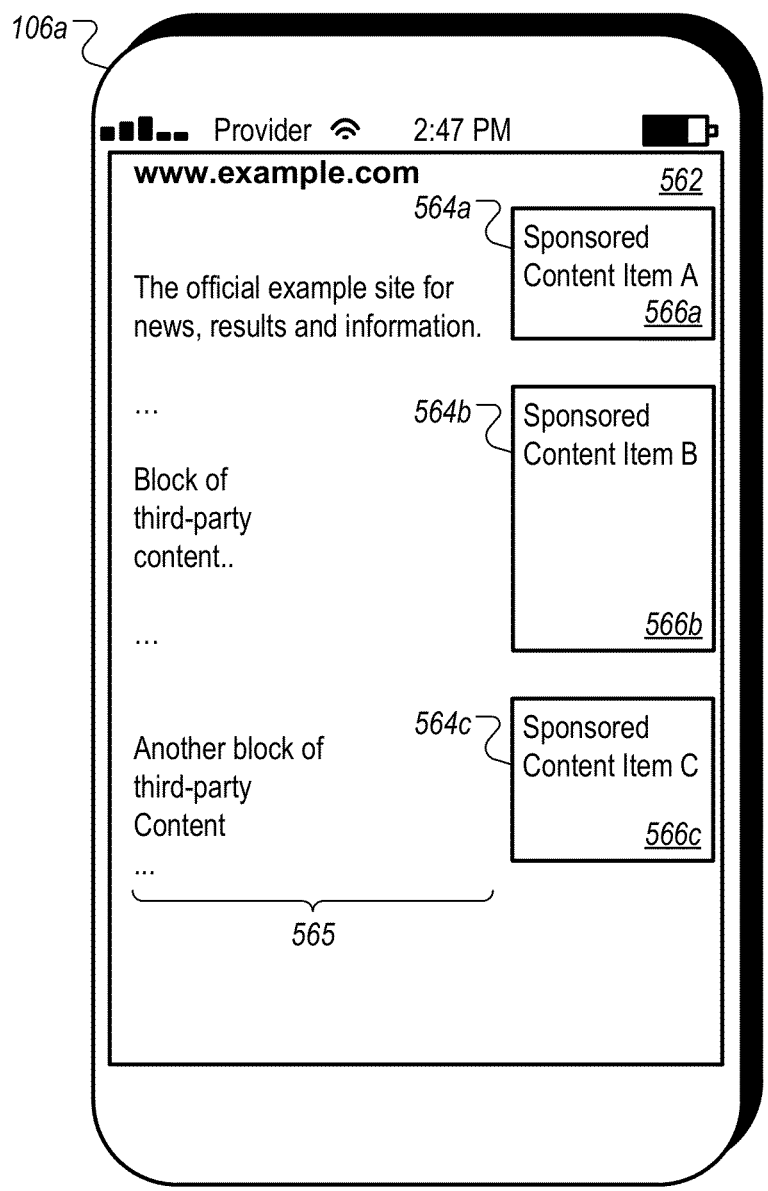
FIG. 4E shows an example resource that includes content item slots.

FIG. 4D is a flow chart of an example process 550 for presenting sponsorship information associated with data transmission (e.g., loading a resource). For example, the sponsorship information can include labels that provide users with a transmission cost (or a reduced cost) to load a resource and information regarding sponsorship of the load that is based on sponsored content items associated with the resource. The process 550 can be performed by the content management system 110 and/or the proxy system 130 (and/or its components). FIGS. 3A and 4E are used to provide example structures for performing the steps of the process 550.

A request is received from a mobile device to load a resource (552). For example, referring to FIG. 3A, the user can enter the query 306 (e.g., "exp") on the device 106a, which can be received, e.g., by the content management system 110. The query 306 can be signal, for example, a potential intent by the user to subsequently load one or more of the search results 304, each associated with a resource, that are generated in response to the query 306. As such, the process 550 can be used, for example, to identify sponsorship of content items associated with a particular resource before the user issues an actual request to load the resource, e.g., by selecting one of the search results 304. In some implementations, the process 550 can begin when the user selects one of the search results 304, e.g., including providing the user with a transmission cost for loading the corresponding resource and an option to continue with the load or cancel the request. In some implementations, other controls can be available to the user for discovering the transmission cost and/or sponsorship for loading a resource, such as selectable controls, hover controls, or some other actionable controls or tools.

A transmission cost for loading the resource over a metered network is determined (554). For example, the proxy system 130 can determine transmission costs associated with loading each of the resources associated with the search results 304a-304c. In some implementations, determining the transmission cost can include determining a size of the resource (e.g., determined by the size engine 122). The price engine 124, for example, can then determine the transmission cost for the resource based on the resource's size and using transmission cost information from the user's carrier plan.

One or more sponsored content items are identified for delivery along with the resource, and the sponsored content items are included in one or more slots for presentation along with third-party content associated with the resource (556). Each sponsored content item has an associated bid that represents an amount that will be paid by the sponsor for presentation of a given sponsored content item.

FIG. 4E, for example, shows an example resource 562 that includes content item slots 564a-564c. For example, the content item slots 564a-564c can be included with third-party content 565 associated with the resource 562 (e.g., a web page). As shown, the content item slots 564a-564c contain the content items 566a-566c (e.g., advertisements) that are identified to be delivered with the resource 562, e.g., when the user selects the search result 304a as described above. For example, the sponsored content items 566a-566c can have associated bids provided by the corresponding content sponsors, the bids representing the amounts that the content sponsors will pay for presentation of the given sponsored content item. Further, the bids can include additional amounts that the content sponsors are willing to pay to sponsor user loads of resources (e.g., web pages) that include their content items (e.g., advertisements). The bids, for example, can be used in an auction system for selecting content items to fill content item slots. The content items 566a-566c can be chosen in the auction, e.g., because they have the highest bids associated with the content item slots 564a-564c.

An amount of credit to be awarded toward load costs is determined based at least in part on the bid (558). For example, the amount of credit can include an amount of credit that is used to reduce the transmission cost, e.g., the amount of the transmission cost for loading the resource that the content sponsor is willing to sponsor. In some implementations, the bids received from the content sponsors and associated with the content items 566a-566c can include a content sponsor-specified amount that is to be used for sponsoring content. For example, content sponsor A may have specified that part of their bid of 5 GH¢ (e.g., for an impression of their advertisement) includes 3 GH¢ for use in offsetting a user's transmission costs for loading the resource 562 containing content sponsor A's sponsored content item 566a (e.g., the advertisement). In some implementations, at least a portion of revenue attributable to the bid for a sponsored content item is provided to offset the transmission cost, e.g., part or all of the bid can be used to offset transmission costs associated with loading the resource. For example, if the bid is 3 GH¢, then 2 GH¢ may be used as the amount of credit to be awarded toward the transmission cost for loading the resource 562 containing the sponsored content item 566a.

In some implementations, the transmission cost can be offset by credits associated with plural different sponsored content items that are to appear in association with the loaded resource. For example, multiple sponsored content items may be included in a single resource, e.g., each associated with a different content sponsor sponsoring a portion of the transmission cost for loading the resource. In this example, the sum of the individual credits can result in a total credit that offsets the entire transmission cost, resulting in a load of the resource that is free to the user.

A label responsive to the request is provided for presentation on the mobile device that indicates, for example, a reduced cost to load the resource when a load of a resource is partially or entirely sponsored based at least in part on the amount of credit that is determined (560). As an example, label 308a, displayed with the search result 304a, can include price components 312a, e.g., identifying the reduced cost of the load (e.g., 1 GH¢).

In some implementations, the process 550 can further comprise presenting an attribution in association with the label when a credit reduces a transmission cost for a resource. For example, label 308a can also include sponsorship information 311 that can include, e.g., a notification that the transmission cost for loading the resource is sponsored, and that the load price (e.g., load price 312a of 1 GH¢) includes a sponsored amount (e.g., 2 GH¢). Other cost amounts can also be displayed for the price component 312a, such as a no-cost or "free" load. This can occur, e.g., when a content sponsor has offered to pick up the entire cost of a load, or if multiple content sponsors are sponsoring different content items included in the resource and the sum of the sponsored credits meets or exceeds the load cost of the resource.

In some implementations, the process 550 can further comprise determining a minimum threshold revenue required to be provided by a sponsor to a publisher in association with a presentation of a given sponsored content item along with the resource, and determining the amount of credit to be awarded toward load costs can further be based on the minimum threshold revenue, including determining when the bid exceeds the minimum threshold revenue. For example, referring to FIG. 4E, the content management system 110 may determine that the publisher of www.example.com requires a minimum threshold revenue of at least 2 GH¢ from content sponsor A for presentation of content sponsor A's content item (e.g., sponsored content item 566a) in the content item slot 564a. The bid by content sponsor A's can be accepted, e.g., if the bid is the highest bid (e.g., among other bids) and/or if the bid includes an amount for sponsoring transmission costs of an associated resource that exceeds the minimum threshold revenue of 2 GH¢. In this example, determining the amount of credit to be awarded toward load costs can further be based on the minimum threshold revenue.

Figure 4F:
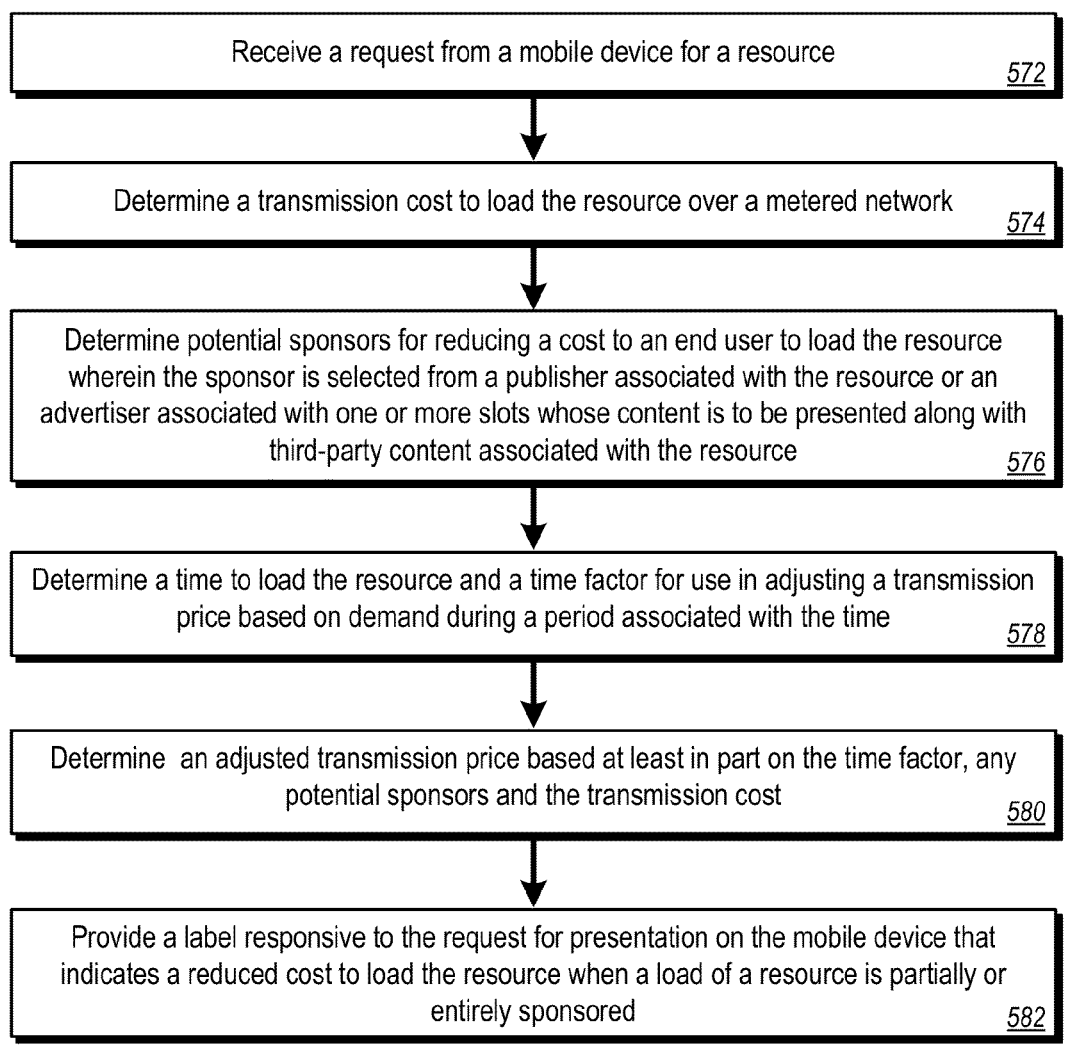
FIG. 4F is a flow chart of an example process for providing reduced transmission price information for a resource to be loaded at a later time.
Figure 5A:
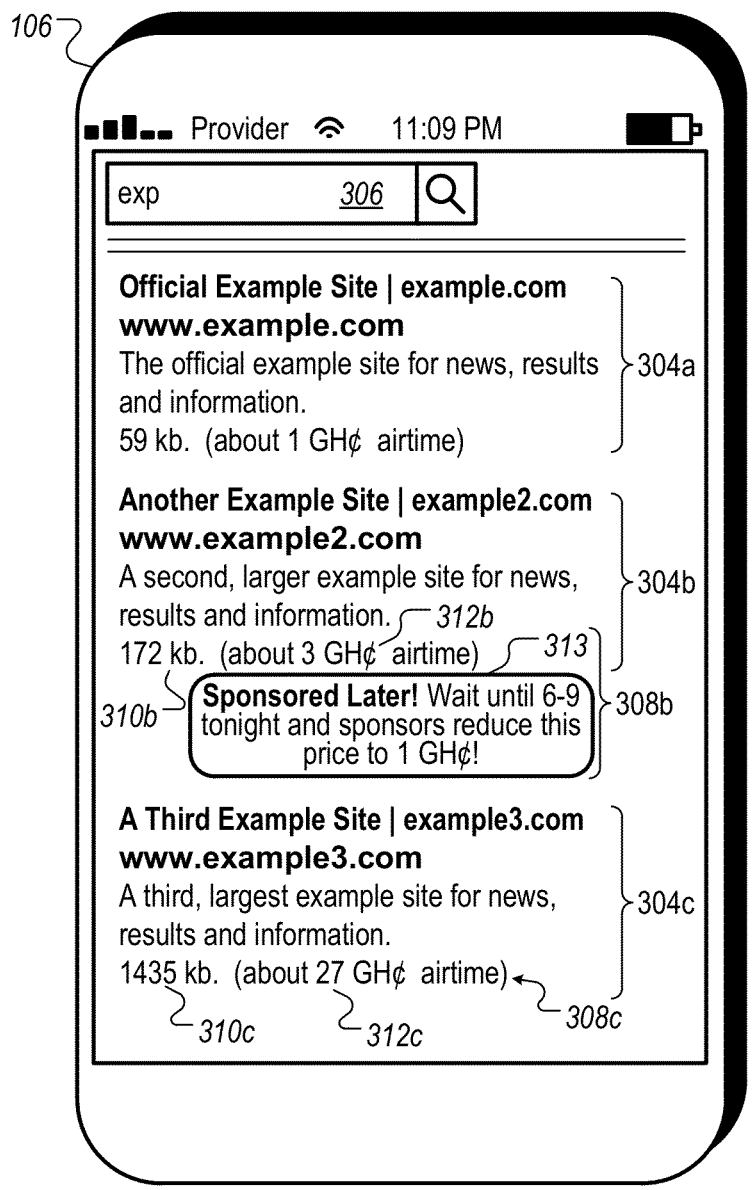
FIG. 5A shows an example label presented on a mobile device that identifies a transmission cost for loading a resource at a later time.

FIG. 4F is a flow chart of an example process 570 for providing reduced transmission price information for a resource to be loaded at a later time. The process 570 can be performed by the content management system 110 and/or the proxy system 130 (and/or its components). FIGS. 3A, 4E and 5A are used to provide example structures for performing the steps of the process 570.

A request is received from a mobile device for a resource (572). For example, referring to FIG. 3A, the user can enter the query 306 (e.g., "exp") on the device 106a, which can be received, e.g., by the content management system 110. In some implementations, the query 306 can be a signal, for example, that the user may select one of the search results 304 responsive to the query 306, initiating a request for the resource. In some implementations, the request for the resource can occur when the user selects a particular search result 304. In some implementations, the process 550 can be used to in order to provide transmission cost information either before or after the user selects a search result 304.

A transmission cost to load the resource over a metered network is determined (574). The proxy system 130, for example, can determine transmission costs associated with loading each of the resources associated with the search results 304a-304c, or the specific one (e.g., search result 304b) selected by the user. In some implementations, determining the transmission cost can include determining a size of the resource (e.g., determined by the size engine 122). The price engine 124, for example, can then determine the transmission cost for the resource based on the resource's size and using, for example, transmission cost information from the user's carrier plan.

Potential sponsors for reducing a cost to an end user to load the resource are determined (576). For example, the potential sponsor can be a publisher associated with the resource, e.g. the publisher of the web page corresponding to the search result 304b. The publisher in this example may want to sponsor part or all of the transmission cost that is required of the end user to load the resource (e.g., the web page www.example2.com). In another example, the potential sponsor can be one of the advertisers associated with one or more slots whose content (e.g., advertisement(s)) is to be presented along with third-party content associated with the resource. For example, referring to FIG. 4E, the potential sponsor of transmission costs of the resource 562 can be any of the content sponsors (e.g., advertisers) associated with any of the content items 566a-566c that appear on the resource 562.

A time to load the resource is determined, and a time factor is determined for use in adjusting a transmission price based on demand during a period associated with the time (578). For example, the content management system can identify a time period (e.g., 6 PM-9 PM) and a time factor (e.g., a cost reduction amount) that is associated with a demand period (e.g., demand periods based on peak usage by end users).

An adjusted transmission price is determined based at least in part on the time factor, any potential sponsors, and the transmission cost (580). For example, the price engine 124 can calculate an adjusted price for the cost of loading the resource associated with search result 304b. The adjusted transmission price (e.g., 1 GH¢) can be the difference between the unsponsored transmission price (e.g., 3 GH¢) of downloading the resource and any amounts (e.g., totaling 2 GH¢) sponsored by the publisher of the resource and/or sponsored by one or more of the advertisers of advertisements to be presented on the resource.

A label responsive to the request is provided for presentation on the mobile device that indicates a reduced cost to load the resource when a load of a resource is partially or entirely sponsored (582). FIG. 5A shows an example label presented on a mobile device that identifies a transmission cost for loading a resource at a later time. For example, the label 308b can include an indicator 313 that says, "Sponsored Later! Wait until 6-9 tonight when sponsors reduce this price to 1 GH¢!"

In some implementations, multiple adjusted transmission prices can be determined, e.g., each for a different time period and each potentially having a different reduced cost for the end user. In some implementations, when multiple adjusted transmission prices have been determined, the lowest cost can be presented first to the end user, and the other cost options associated with other time periods can be accessible to the end user using various controls.

Figure 5B:
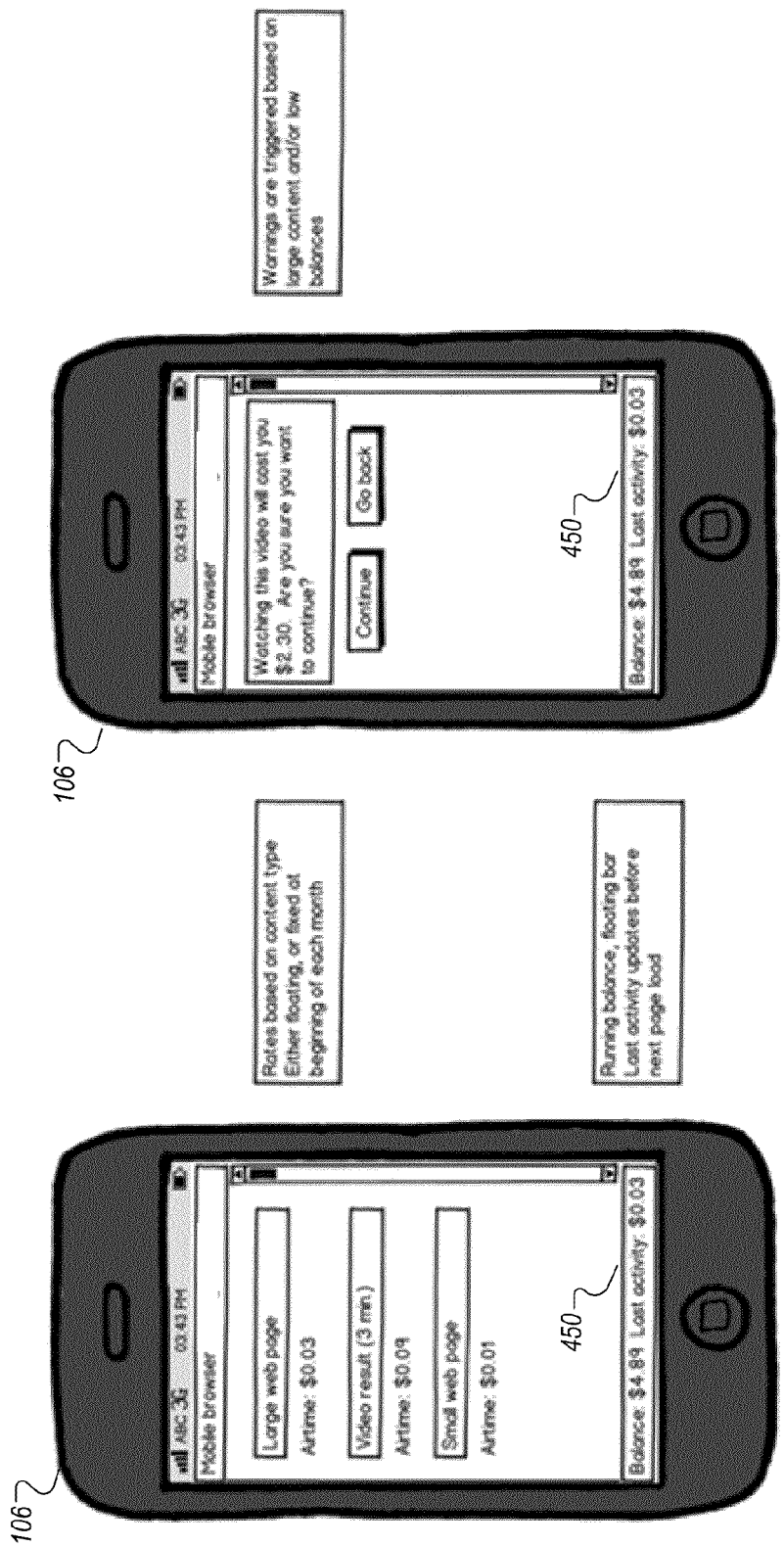
FIG. 5B shows example displays that include last activity data of the user.

As discussed above, other information can be presented along with the rate sensitive pricing data. FIG. 5B shows example displays that include last activity of the user. For example, statistics 450 can include a current balance (e.g., $4.89) for the user and the cost of a last activity (e.g., $0.03). Costs and balances can be presented (to the user) with reference to a currency specified by the user, the currency of the user's data plan, and/or a local currency (e.g., based on the user's current location). Other ways of presenting the user's current balance and last activity can be used.

FIG. 5C shows a table 458 of example guaranteed rates. For example, rates 460 can be guaranteed for a user for each of various corresponding content types 462 and units 464 (e.g., per page, per minute viewed, per minute used, or other rates). The rates can be semi-floating rates for individual downloads (e.g., for search results) and based on content type. Example content types include webpages of various sizes, images, video and other content (e.g., social content, email, etc.). Guaranteed pricing can be based on content type 462, e.g., instead of or in addition to the size considerations and factors described above. For example, data plans can be established where downloading a medium-sized page costs X, downloading a one-minute video costs Y, and other downloads of various content types and sizes have other different rates. Rates can be defined and/or presented to users in a currency specified by the user, the currency of the user's data plan, and/or a local currency (e.g., based on the user's current location).

FIG. 5D shows an example environment 468 for compressing information before it is provided to a user device. For example, at step 1, a client browser 470 (e.g., on the user device 106) can provide a request to a proxy server 472 (e.g., the proxy system 130). The request can be, for example, a request for a resource (e.g., such as a request for a web page, an application, a request for a search result or other resource). At step 2, the proxy server 472 can forward the request to a web server 474 and receive content responsive to the request. At step 3, instead of providing the requested content directly to the client browser 470 in a non-compressed state, the proxy server 472 can obtain a compressed version of the data from a compression engine 476. In some implementations, the proxy server 472 can determine whether compression is required, then forward the content for compression if necessary. In some implementations, compression can be optional depending, for example, on constraints associated with the system or on timing constraints associated with the received request. For example, content that is less than a predetermined size may not be compressed as they are deemed too small. In some implementations, the compression engine 476 can be a third party engine, associated with the proxy server 472 or be included in the proxy server 472. In some implementations, the content for potential compression can be evaluated, and only compressed is sufficient benefit will result. Benefits can include both cost and/or timing benefits. At step 4, the proxy server 472 can provide the compressed content to the client browser 470.

Figure 6:
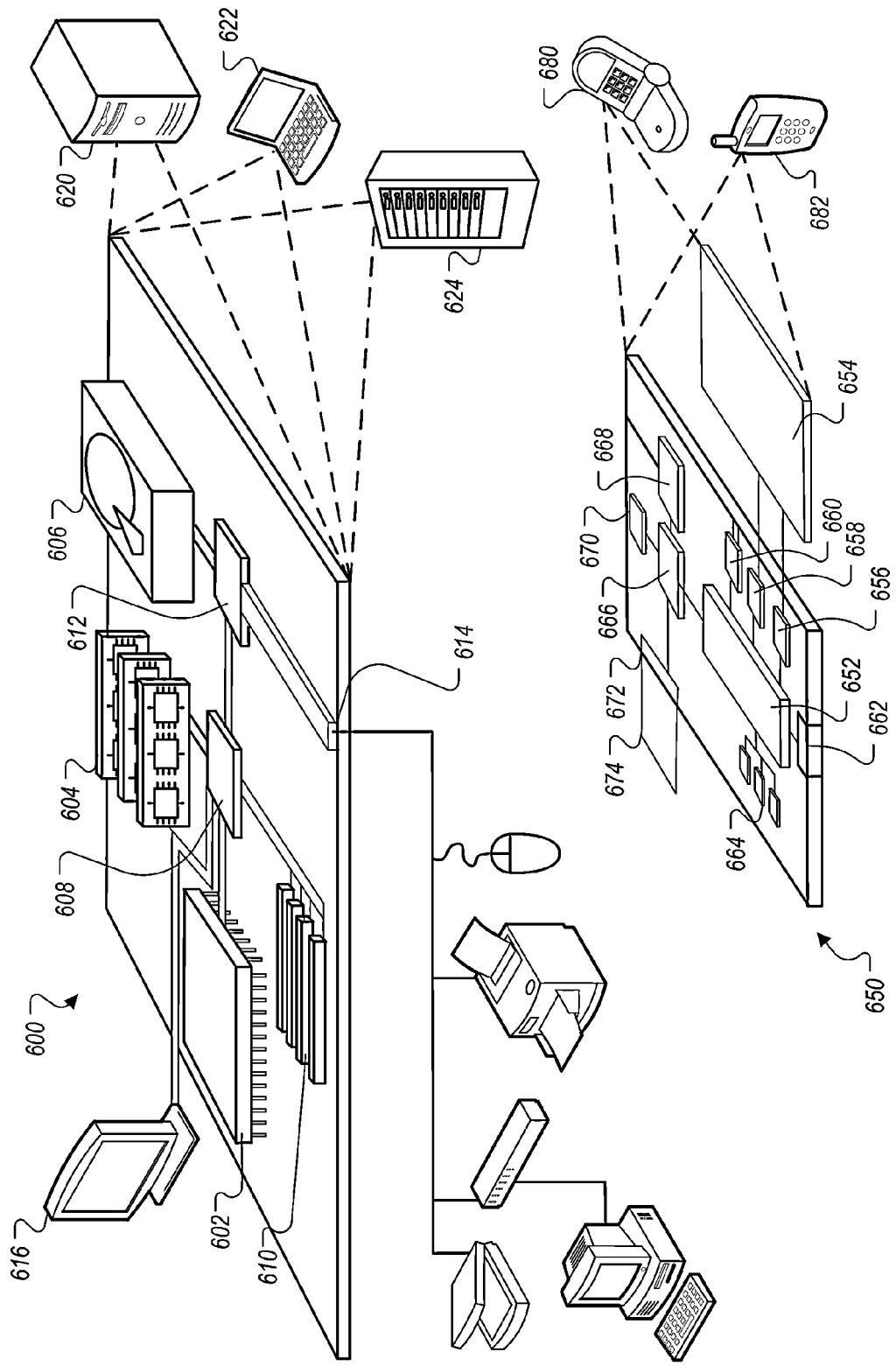
FIG. 6 is a block diagram of an example computer system that can be used to implement the methods, systems and processes described in this disclosure.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, tablet computing devices, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computing device, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a request from a mobile device to load a resource;
   determining a transmission cost for loading the resource over a metered network;
   identifying one or more sponsored content items for delivery along with the resource, the sponsored content items being included in one or more slots for presentation along with third-party content associated with the resource, each sponsored content item having an associated bid that represents an amount that will be paid by the sponsor for presentation of a given sponsored content item;
   determining an amount of credit to be awarded toward load costs based at least in part on the bid; and
   providing a label responsive to the request for presentation on the mobile device that indicates a reduced cost to load the resource when a load of a resource is partially or entirely sponsored based at least in part on the amount of credit that is determined.

2. The method of claim 1, further comprising:
   determining a minimum threshold revenue required to be provided by a sponsor to a publisher in association with a presentation of a given sponsored content item along with the resource, and
   wherein determining the amount of credit to be awarded toward load costs is further based on the minimum threshold revenue, including determining when the bid exceeds the minimum threshold revenue.

3. The method of claim 1 wherein the amount of credit is used to reduce the transmission cost and wherein at least a portion of revenue attributable to the bid for a sponsored content item is provided to offset the transmission cost.

4. The method of claim 3 wherein the transmission cost is offset by credits associated with plural different sponsored content items that are to appear in association with the loaded resource.

5. The method of claim 1 further comprising presenting an attribution in association with the label when a credit reduces a transmission cost for a resource.

6. The method of claim 1 wherein determining a true cost includes determining a true cost from a plurality of carriers.

7. The method of claim 1 wherein the label includes an estimate of the size based at least in part on historical data associated with the one resource.

8. The method of claim 1 wherein the label includes an estimated size based at least in part on a retrieval of the one resource by a proxy prior to transmission of data associated with the one resource responsive to the request.

9. The method of claim 1 wherein the label includes a size estimate and a descriptor of a relative size of the transfer.

10. The method of claim 1 wherein the label includes a price associated with the data transfer.

11. A computer-implemented method comprising:
    receiving a request from a mobile device for a resource;
    determining a transmission cost to load the resource over a metered network;
    determining potential sponsors for reducing a cost to an end user to load the resource wherein the sponsor is selected from a publisher associated with the resource or an advertiser associated with one or more slots whose content is to be presented along with third-party content associated with the resource;
    determining a time to load the resource and a time factor for use in adjusting a transmission price based on demand during a period associated with the time;
    determining an adjusted transmission price based at least in part on the time factor, any potential sponsors and the transmission cost; and
    providing a label responsive to the request for presentation on the mobile device that indicates a reduced cost to load the resource when a load of a resource is partially or entirely sponsored, wherein the reduced cost is based, at least in part, on the determined time and the determined adjusted transmission price.

12. A computer program product embodied in a tangible medium including a memory having instructions, that when executed, cause a processor to:
    receive a request from a mobile device to load a resource;
    determine a transmission cost for loading the resource over a metered network;
    identify one or more sponsored content items for delivery along with the resource, the sponsored content items being included in one or more slots for presentation along with third-party content associated with the resource, each sponsored content item having an associated bid that represents an amount that will be paid by the sponsor for presentation of a given sponsored content item;
    determine an amount of credit to be awarded toward load costs based at least in part on the bid; and
    provide a label responsive to the request for presentation on the mobile device that indicates a reduced cost to load the resource when a load of a resource is partially or entirely sponsored based at least in part on the amount of credit that is determined.

13. A system comprising:
    a processor; and
    a memory including instructions that when executed cause the processor to:
    receive a request from a mobile device to load a resource;
    determine a transmission cost for loading the resource over a metered network;
    identify one or more sponsored content items for delivery along with the resource, the sponsored content items being included in one or more slots for presentation along with third-party content associated with the resource, each sponsored content item having an associated bid that represents an amount that will be paid by the sponsor for presentation of a given sponsored content item;

determine an amount of credit to be awarded toward load costs based at least in part on the bid; and provide a label responsive to the request for presentation on the mobile device that indicates a reduced cost to load the resource when a load of a resource is partially or entirely sponsored based at least in part on the amount of credit that is determined.

* * * * *